(12) United States Patent
Ohshita

(10) Patent No.: US 7,372,992 B2
(45) Date of Patent: May 13, 2008

(54) IMAGE DATA PROCESSING MACHINE

(75) Inventor: Masakazu Ohshita, Kawasaki (JP)

(73) Assignee: Ricoh Co., Ltd., Tokyo (JP)

( * ) Notice: Subject to any disclaimer, the term of this patent is extended or adjusted under 35 U.S.C. 154(b) by 737 days.

(21) Appl. No.: 10/976,775

(22) Filed: Nov. 1, 2004

(65) Prior Publication Data

US 2005/0219620 A1    Oct. 6, 2005

(30) Foreign Application Priority Data

Oct. 31, 2003    (JP)    ............... 2003-373376

(51) Int. Cl.
*G06K 9/34*    (2006.01)
(52) U.S. Cl. .................................. 382/173
(58) Field of Classification Search ................ 382/173, 382/177, 181, 190, 195, 199, 256, 266, 267, 382/269, 298, 299; 358/1.9, 3.26, 3.27, 447, 358/448, 449, 534, 462
See application file for complete search history.

(56) References Cited

U.S. PATENT DOCUMENTS

| 5,596,684 A | * | 1/1997 | Ogletree et al. | ............. | 358/1.9 |
| 5,638,463 A | | 6/1997 | Ohshita | | |
| 5,666,213 A | * | 9/1997 | Ohshita et al. | ............. | 358/448 |

FOREIGN PATENT DOCUMENTS

| JP | 05-207282 | 8/1993 |
| JP | 09-107475 | 4/1997 |
| JP | 2000-236446 | 8/2000 |
| JP | 2000-270208 | 9/2000 |
| JP | 2002-158877 | 5/2002 |

OTHER PUBLICATIONS

U.S. Appl. No. 09/789,515, filed Feb. 22, 2001, Ohshita.
U.S. Appl. No. 10/976,775, filed Nov. 1, 2004, Ohshita.

* cited by examiner

*Primary Examiner*—Jose L. Couso
(74) *Attorney, Agent, or Firm*—Oblon, Spivak, McClelland, Maier & Neustadt, P.C.

(57) ABSTRACT

An image data processing machine implementing image processing of image data input with different resolution values in consideration of resolution and qualities of image outputs. A digital reproduction apparatus incorporating the image data processing machine retrieves correction data stored in advance on an objective pixel by a memory block according to pattern code information generated by a pattern recognition mechanism as an address and renders the correction data to be multi-valued. The memory block converts image data from binary to multi-value, in which the process of data conversion is different between a first case of image data output with the same resolution as input data and a second case of image data output with an arbitrary resolution at least twice higher, and which image data are output with a variable power of two in the direction of 2×H times pixel increase with respect to a pixel composition of fully white and fully black pixels of Y-bit multi-valued input binary image data by a multiple density mode image pattern generator.

18 Claims, 25 Drawing Sheets

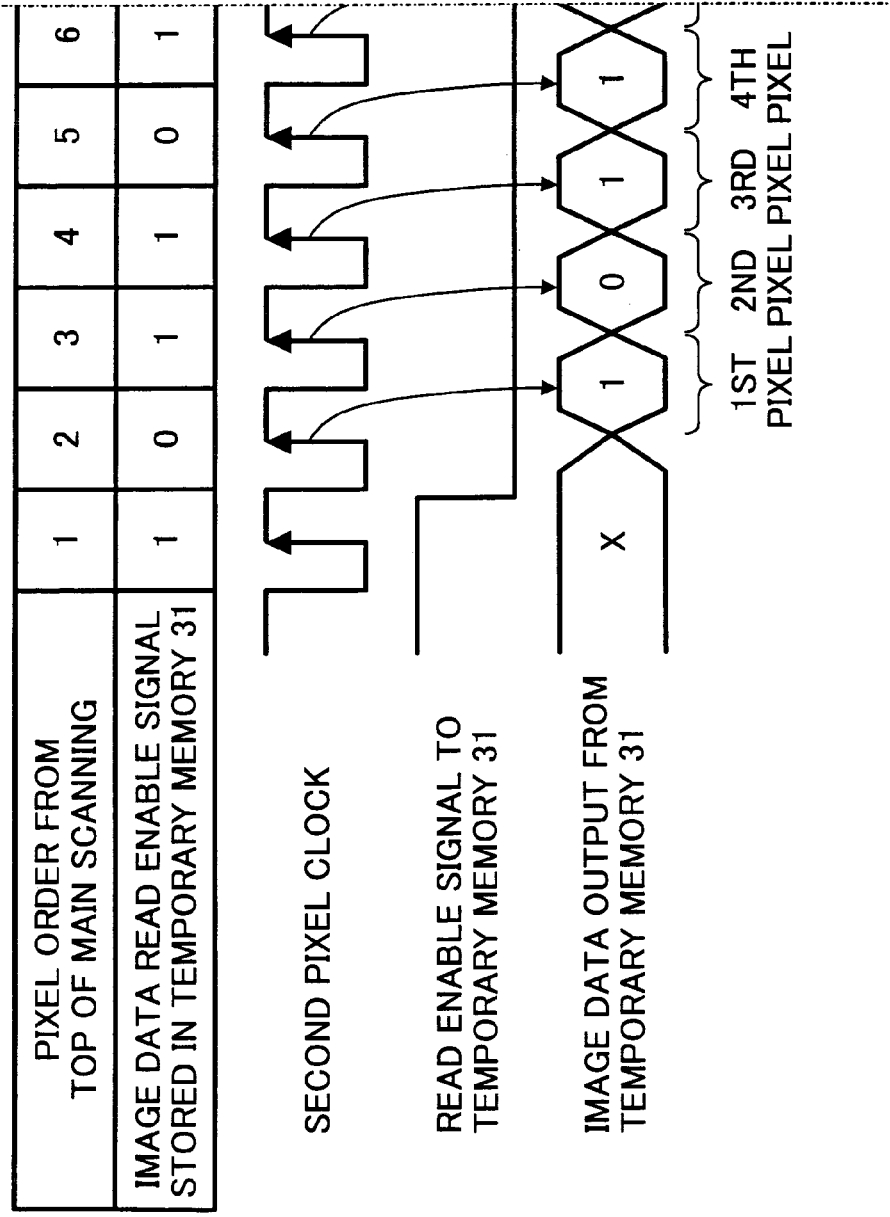

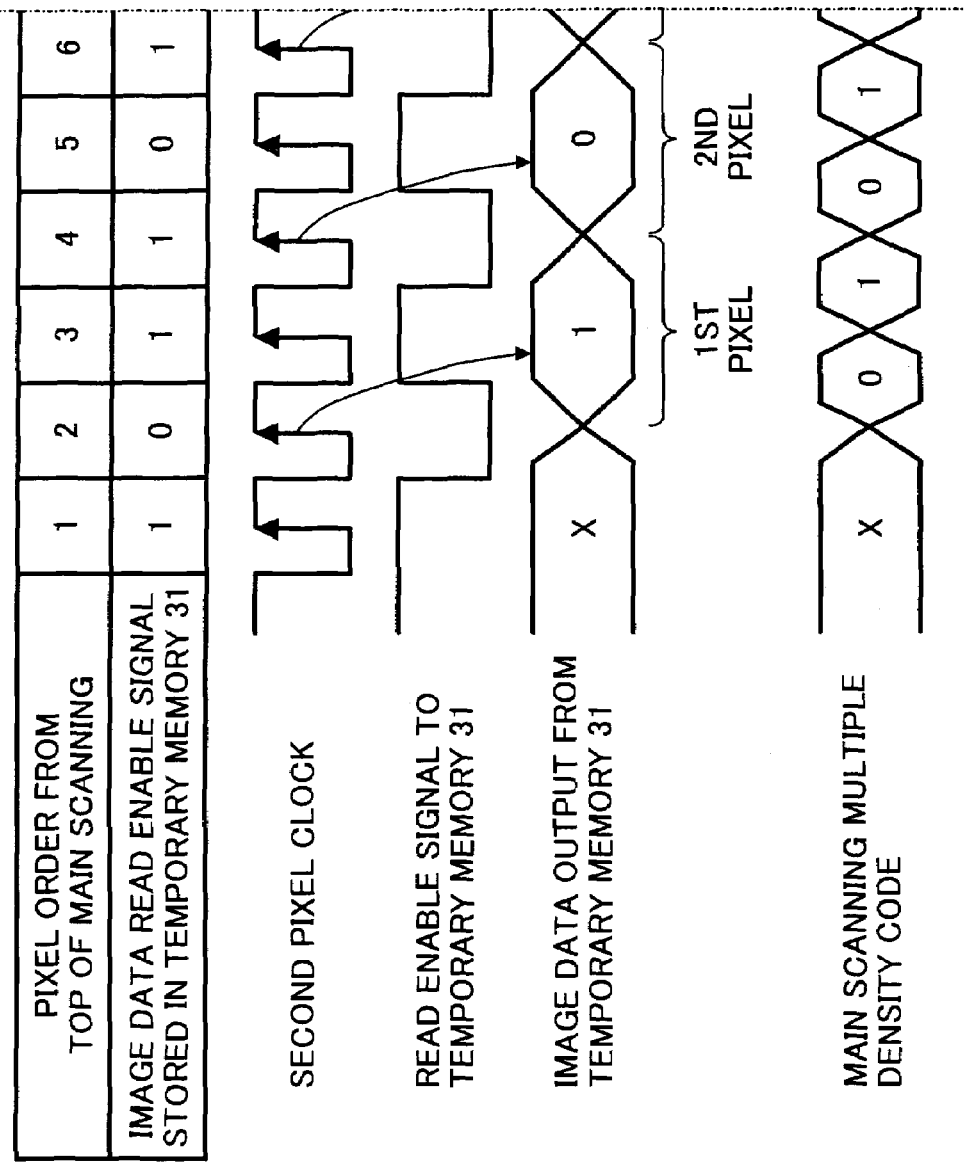

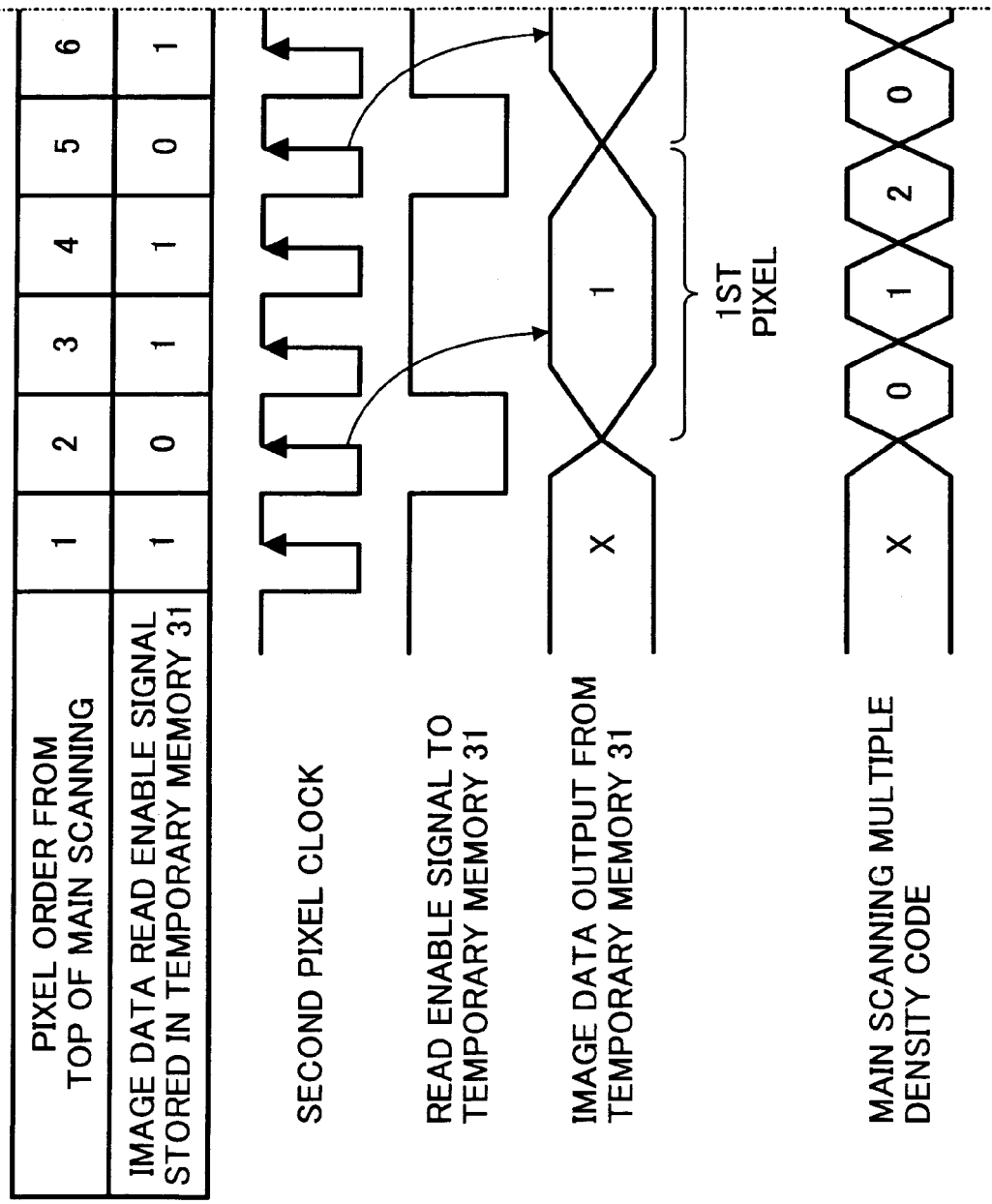

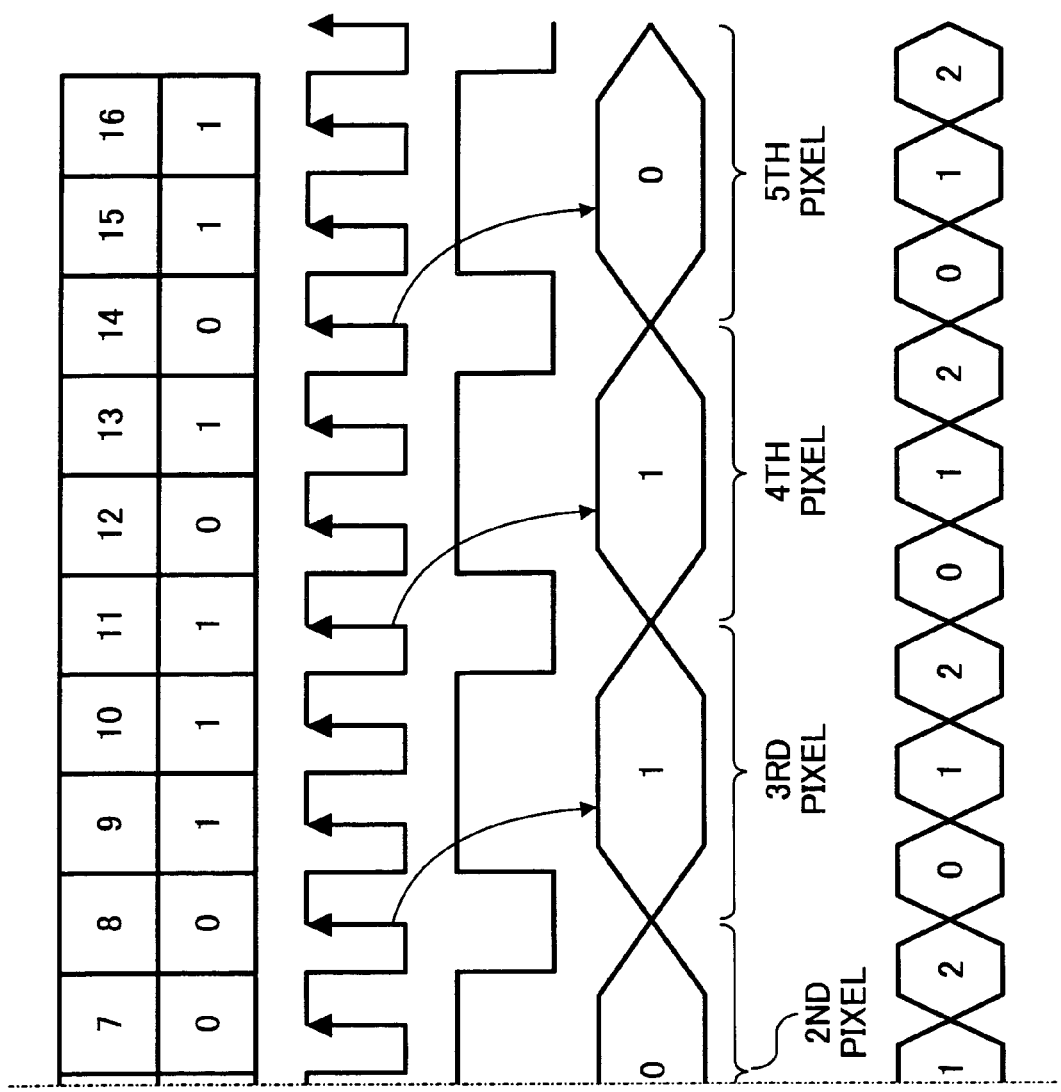

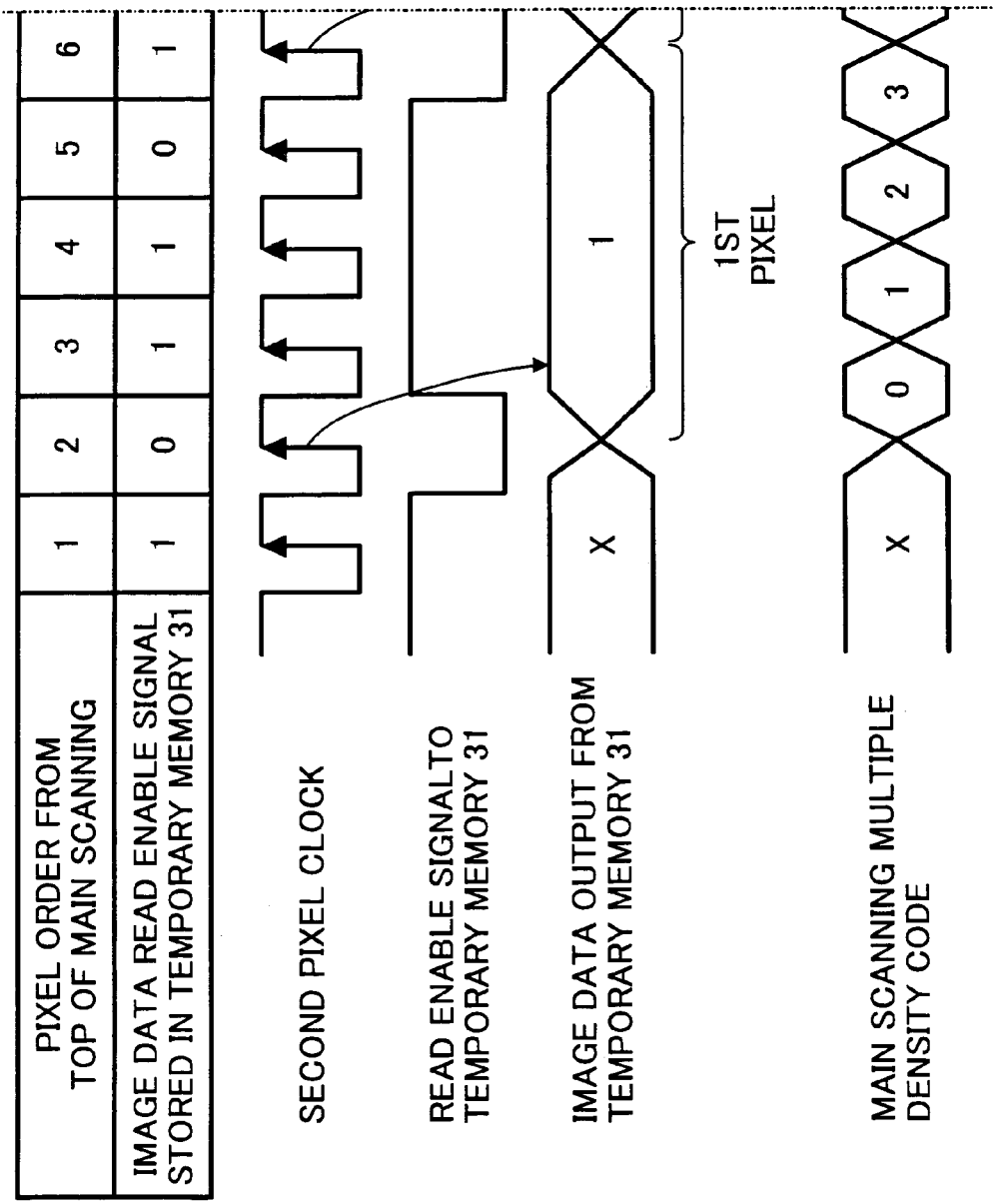

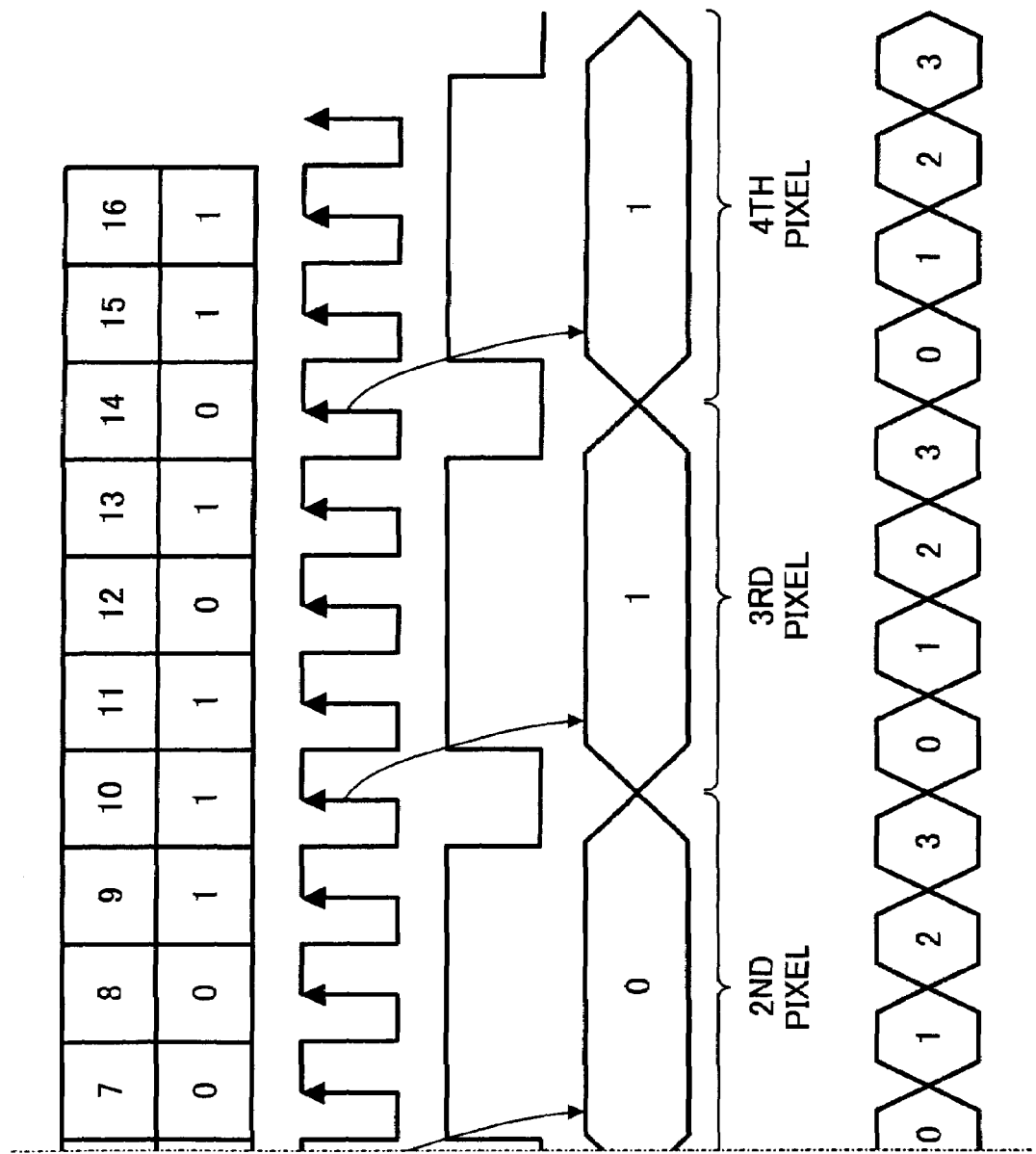

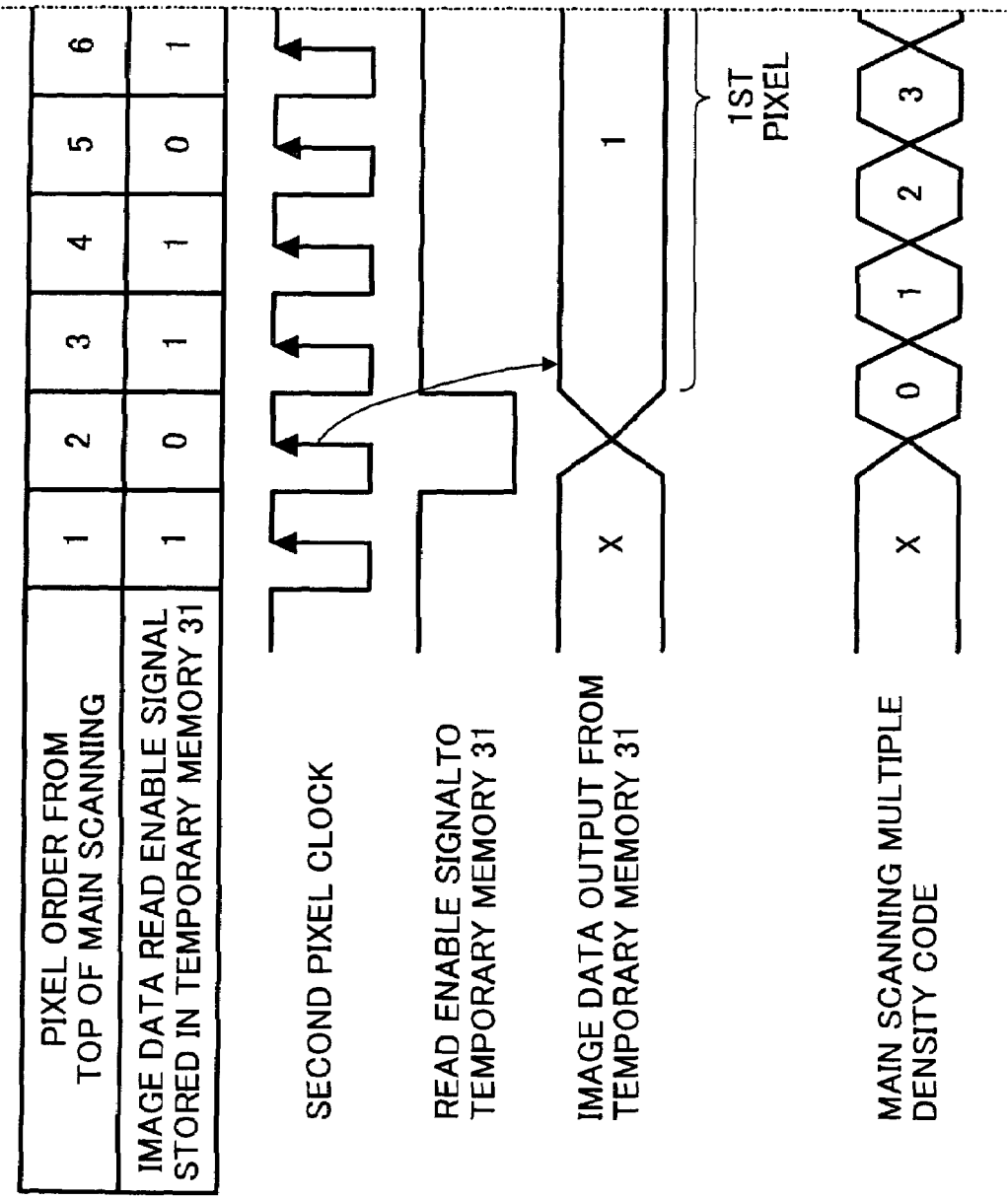

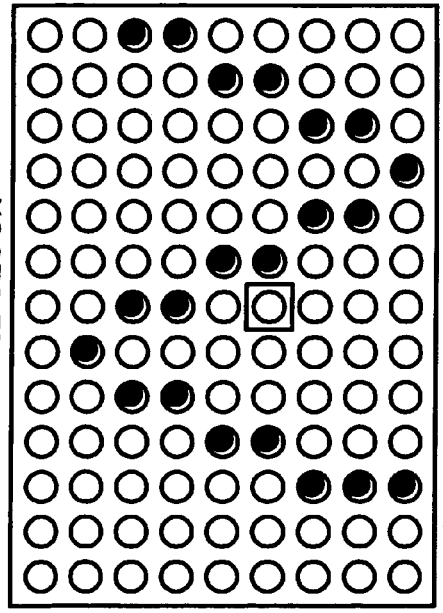
FIG. 10A AT LEADING EDGE T1 OF SECOND PIXEL CLOCK
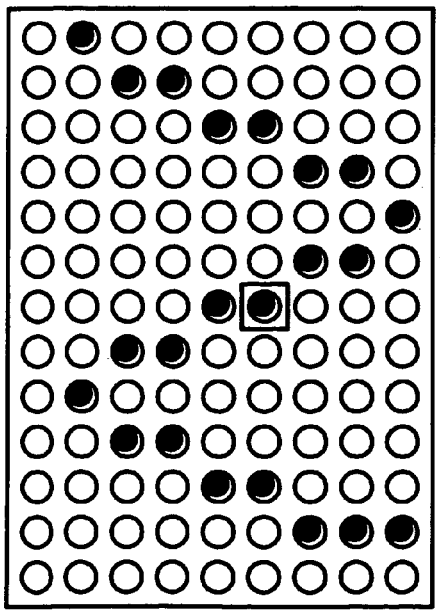
FIG. 10B AT NEXT LEADING EDGE T2 OF SECOND PIXEL CLOCK
SHIFT BY ONE PIXEL IN HORIZONTAL SCANNING DIRECTION
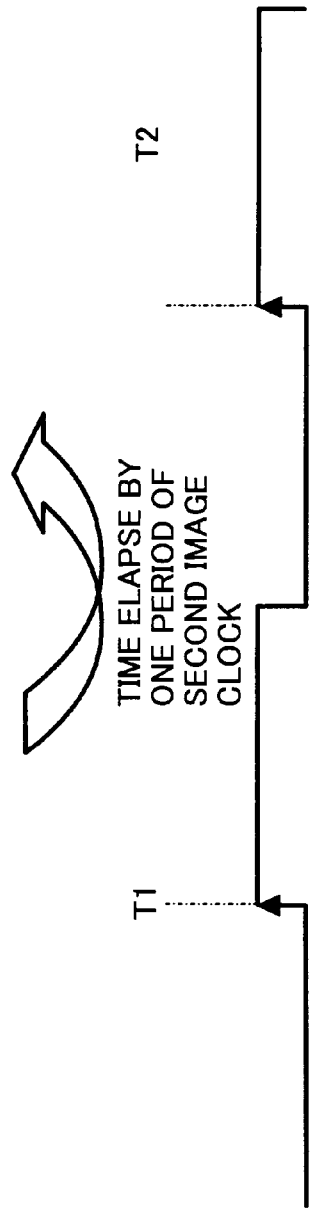
FIG. 10C

FIG. 18A
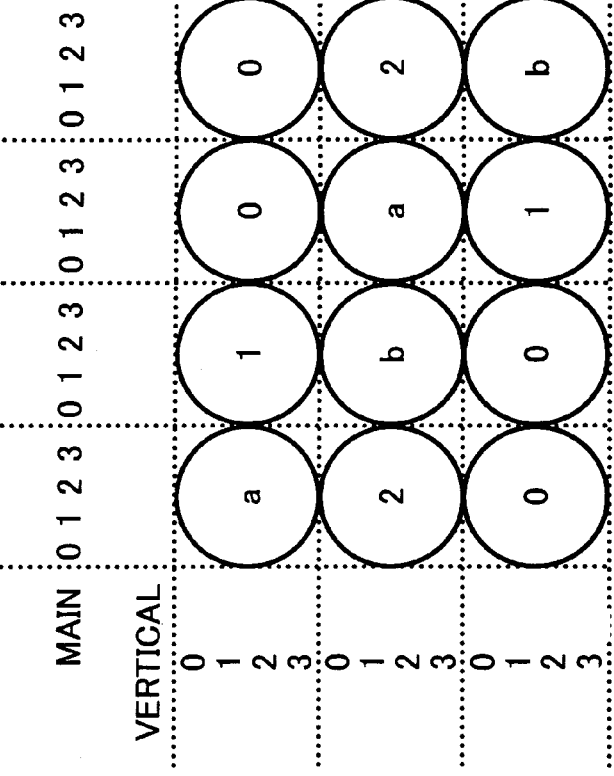
CODE DURING PATTERN RECOGNITION
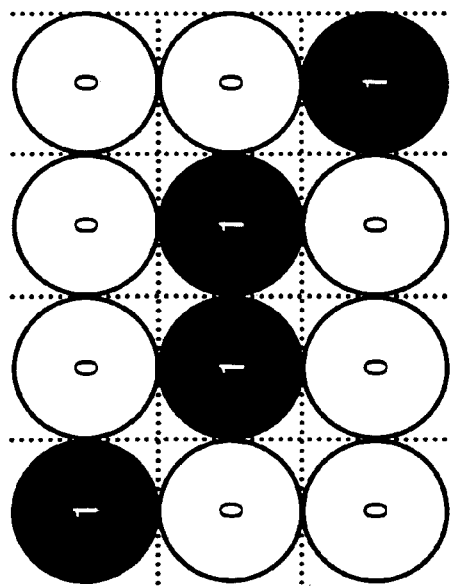
QUADRUPLE DENSITY MODE
INPUT: BINARY 300dpi
| FIG. 18 | |
|---|---|
| FIG. 18A | |
| FIG. 18B | |

FIG. 19A
FIG. 19
| FIG. 19A |
| FIG. 19B |
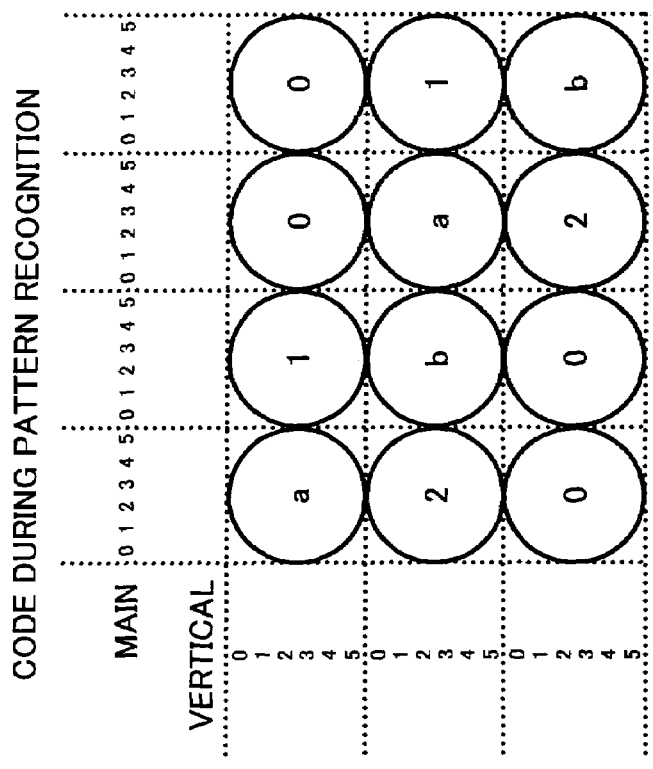
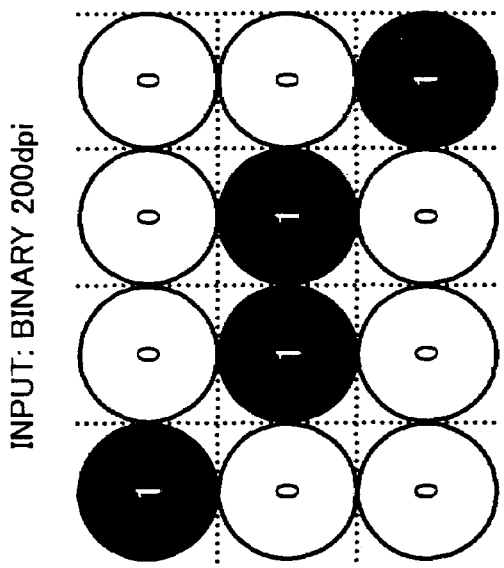

IMAGE DATA PROCESSING MACHINE

BACKGROUND OF THE INVENTION

1. Field of the Invention

The present invention relates generally to image data processing machines, and more specifically to an image data processing machine for implementing image processing of input image data with different resolution values in consideration of the resolution and qualities of image outputs and for attaining improvements in image quality through minimal processing steps and at reduced costs.

2. Discussion of the Background

In increasingly versatile image data processing machines such as digital duplication apparatuses and other similar apparatuses, several improvements have been made on image qualities. For example, the improvements in image qualities have been carried out with respect to image data expanded into a bitmap through correcting jaggies (or jagged edges) on contour lines of the images.

Some of the correction processes have been disclosed previously so as to reduce to the utmost the amount of required data that are stored in advance in a memory, and to carry out in a reduced period of time by a microprocessor and other devices through process steps as simple as possible to discriminate pixels to be corrected and determine correction data on the pixels discriminated to be corrected.

The correction processes include the methods that are briefly summarized as follows.

Namely, Japanese Laid-Open Patent Applications No. 5-207282 and 2000-236446 disclose image data processing carried out by recognizing a line segment feature of a boundary between a black pixel region and a white pixel region in image data expanded into a bitmap, replacing characteristics of the thus recognized line segment feature for respective necessary pixels with plural-bit pattern code information, discriminating whether the pixels are required to be corrected utilizing at least a portion of the pattern code information, and making corrections to the pixels discriminated as required to be corrected according to the code information.

In addition, an image data processing machine configured to implement the above noted image data processing includes a window for extracting data of respective pixels in a predetermined region centering around an objective pixel among image data expanded into a bitmap; a pattern recognition means for generating pattern code information of plural bits for characterizing the line segment feature concerning the objective pixel after recognizing a line segment feature of a boundary between a black pixel region and a white pixel region in the image data based on the data extracted by the window; a discriminant means, utilizing at least a portion of the pattern code information, for discriminating whether the objective pixel is required to be corrected; and a correction data memory for retrieving and afterward outputting correction data stored in advance, according to the pattern code information generated by the pattern recognition means as an address, for pixels discriminated as required to be corrected by the discriminant means.

In addition, the pattern recognition means generates, as the code information for characterizing the line segment feature recognized based on the extracted data, code information including several codes such as a first code for indicating the objective pixel for the pattern recognition as either black or white, a second code for the direction of line segment inclination either upward or downward, a third code for the steepness of the inclination, and a fourth code for the position of the objective pixel with respect to the end pixel of the line segment continuous in the horizontal and vertical direction.

According to such an image data processing method and image data processing machine as described hereinabove, image data processing is carried out by recognizing a line segment feature of the boundary part (for example, a contour line of a character and others) between a black pixel region and a white pixel region in image data expanded into a bitmap, replacing with plural-bit pattern code information for respective necessary pixels, discriminating whether the pixels are required to be corrected utilizing at least a portion of the pattern code information, and making corrections to the pixels discriminated as required to be corrected according to the code information.

In this method, therefore, it becomes unnecessary to generate and store in advance, as a template, all necessary characteristic patterns required to be corrected; and the steps to discriminate pixels required to be corrected and determine correction data for pixels discriminated as required to be corrected are carried out with more ease in a reduced period of time.

In addition, although data smoothing according to different resolutions of input image data has been made previously using each different image correction data, the method of smoothing has required so far a considerable volume of memory for storing image correction data used in the image processing, and the memory volume required for data conversion tends to increase more as data with a lower resolution are converted to data with a higher resolution (Japanese Laid-Open Patent Application No. 9-107475).

In those previous methods, therefore, the improvements have been made on image qualities of image data expanded into a bitmap through correcting jaggies on contour lines of the images with the data to be stored being reduced to the utmost and in a reduced period of time. In addition, output images with high quality have been provided based on resolution information on input image by selecting a method of suitably processing the image data at least in the case of no account of different values of resolution.

SUMMARY OF THE INVENTION

However, the present inventors recognized that further improvements are preferable to provide methods of image process considering different resolution values of input images and also resolution of and qualities of output images, which can be implemented through minimal processings at reduced costs.

Accordingly, it is an object of this invention to provide an image data processing machine capable of achieving the foregoing and other objects, and overcoming the shortcomings discussed above. The image data processing machine is configured to implement image processing of input image data of different resolution values in consideration of resolution and qualities of image outputs and to attain improvements in image quality through minimal processings and at reduced costs.

The following description is a synopsis of only selected features and attributes of the present disclosure. A more complete description thereof is found below in the section entitled "Description of the Preferred Embodiments".

The image data processing machine in accordance with the invention includes a memory capable of storing at least image data of at least of N lines among input binary image data expanded into a bitmap with an arbitrary resolution. A window extracts respective pixel data in a predetermined region centering around an objective pixel among stored image data stored in the memory and expanded into the bitmap of M pixels in the main scanning direction and N lines of the M pixels in the vertical scanning direction. A pattern recognition mechanism generates pattern code information with plural bits for characterizing a line segment feature concerning the objective pixel after recognizing the line segment feature of the boundary between a black pixel region and a white pixel in the respective pixel data extracted by the window. A discriminant mechanism discriminates whether the objective pixel is required to be corrected as a pixel for forming an oblique line or a circular arc utilizing at least a portion of the pattern code information. A memory block mechanism retrieves correction data stored in advance for pixels discriminated as to be corrected by the discriminant mechanism among the objective pixels according to pattern code information generated by the pattern recognition mechanism as an address, and renders the correction data to be multi-valued and subsequently be output.

The memory block mechanism is configured, in the process of rendering the input binary image data expanded into a bitmap with an arbitrary solution to be multi-valued based on characteristics of the line segment feature recognized by the pattern recognition unit, to implement data conversion during an image data conversion from binary to multi-value, in which data conversion is different between a first case in which multi-valued image data are output with the same resolution as input image data and a second case in which further multi-valued image data are output with an arbitrary resolution at least twice higher, and with an increased number of pixels at least twice larger, than the input image data. In the second case in which the input binary image data with an arbitrary solution are output as Y-bit multi-valued image data with a resolution of at least twice larger and with an increased number of pixels of H ($\geq 2$) times that of the input image data, the memory block unit is further provided with a multiple density mode image pattern generator for implementing a conversion of the Y-bit multi-valued image data with an arbitrary resolution into two kinds of data indicative of fully white and fully black pixels among the Y-bit multi-valued input binary image data so that, in the case in which the input binary image data with an arbitrary solution are output as Y-bit multi-valued image data with an increased number of pixels of 2×H times, image data are output by the multiple density mode image pattern generator with a variable power of two in the direction of 2×H times pixel increase with respect to a pixel composition of the fully white and fully black pixels of Y-bit multi-valued input binary image data with an arbitrary resolution with an increased number of pixels of H-times.

In addition, the multiple density mode image pattern generator is also adapted to generate a plurality of sets of data different for respective pixel compositions each designated by a prime number specified by the number of multiplication H of pixels in the image output with respect to image input as the two kinds of Y-bit multi-valued data indicative of fully white and fully black pixels with an arbitrary resolution.

These and other features and advantages of the present invention will be more clearly seen from the following detailed description of the present invention which is provided in connection with the accompanying drawings.

BRIEF DESCRIPTION OF THE DRAWINGS

In the following drawings, like references numerals are used to refer to like elements in the various drawings, in which:

FIG. 5 is a timing diagram illustrating that the readout of image data is carried out in synchronous with every third pulse of the second pixel clock;

FIG. 6 is a timing diagram illustrating that the readout of image data is carried out in synchronous with every fourth pulse;

FIG. 10A is a drawing illustrating image data at a leading edge (the time T1 of FIG. 10C) in the shift registers 41a through 41i for forming the window 41 of FIG. 9;

FIG. 10B is a drawing illustrating the image data at a second leading edge (the time T2 of FIG. 10C);

FIG. 10C includes a timing diagram illustrating the pulse sequence from a second pixel clock used for shifting image data;

DESCRIPTION OF THE PREFERRED EMBODIMENTS

Figure 1:
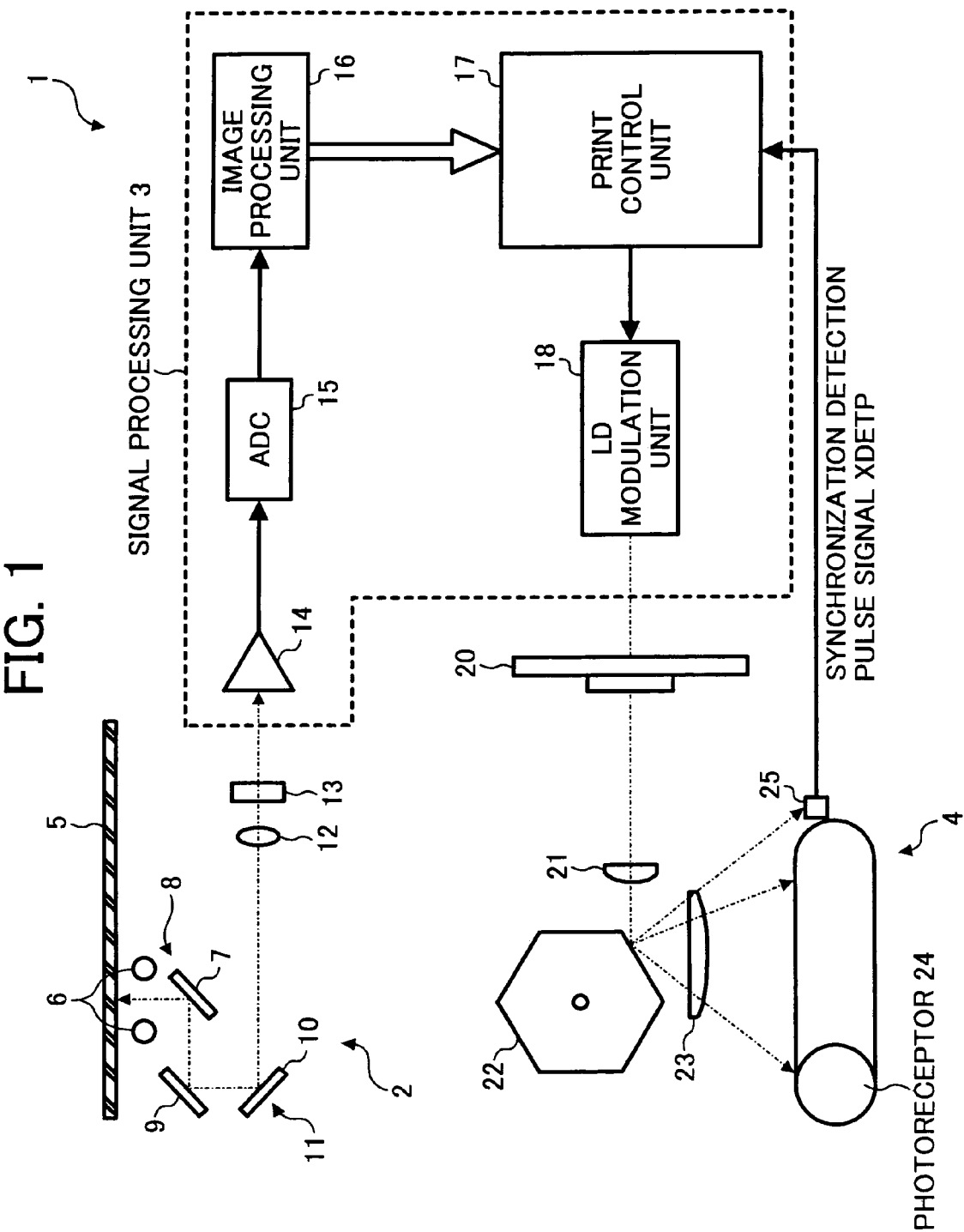
FIG. 1 is a schematic diagram illustrating a digital reproduction apparatus 1 incorporating the image data processing machine according to an exemplary embodiment of this invention.

In the detailed description which follows, specific embodiments of an image data processing machine are described, which are capable of suitably processing image data considering resolution and qualities of output images.

It is understood, however, that the present disclosure is not limited to these embodiments. For example, it is appreciated that the use of the image data processing machine and several units included therein may also be adaptable to any form of image data processing. Other embodiments will be apparent to those skilled in the art upon reading the following description.

The image data processing machine 1 in accordance with the exemplary embodiment of the invention is adapted, during implementing several image data processings of:

extracting respective pixel data in a predetermined region centering around an objective pixel among image data expanded into a bitmap with an arbitrary resolution as a bitmap in a window of M pixels in the main scanning direction and N lines of the M pixels in the vertical scanning direction;

generating by pattern recognition the pattern code information with plural bits for characterizing the line segment feature concerning to the objective pixel after recognizing a line segment feature of the boundary between a black pixel region and a white pixel in the respective pixel data extracted by the window;

utilizing at least a portion of the pattern code information, discriminating by a discriminant mechanism whether the objective pixel is required to be corrected as a pixel for forming an oblique line or a circular arc; and retrieving correction data stored in advance for pixels discriminated as to be corrected among the objective pixels according to the pattern code information generated by the pattern recognition as an address, and to render the correction data to be multi-valued and subsequently be output;

to instruct a memory block to implement data conversion during an image data conversion from binary to multi-value, in which the data conversion is different between a first case in which multi-valued image data are output with the same resolution as input image data, and a second case in which further multi-valued image data are output with an arbitrary resolution at least twice higher, and with an increased number of pixels at least twice larger, than the input image data; and in the second case in which the input binary image data with an arbitrary solution are output as Y-bit multi-valued image data with a resolution of at least twice larger and with an increased number of pixels of H ($\geqq 2$) times that of the input image data, the memory block is further provided with a multiple density mode image pattern generator configured to implement the conversion of the Y-bit multi-valued image data with an arbitrary resolution into two kinds of data indicative of fully white and fully black pixels among the Y-bit multi-valued input binary image data so that, in the case in which the input binary image data with an arbitrary solution are output as Y-bit multi-valued image data with an increased number of pixels of 2×H times, image data are output by the multiple density mode image pattern generator with a variable power of two in the direction of 2×H times pixel increase with respect to a pixel composition of the fully white and fully black pixels of Y-bit multi-valued input binary image data with an arbitrary resolution with an increased number of pixels of H-times.

In addition, the multiple density mode image pattern generator is also adapted to generate, as the noted two kinds of Y-bit multi-valued data indicative of fully white and fully black pixels with an arbitrary resolution, a plurality of sets of data different for respective pixel compositions each designated by a prime number specified by the number of multiplication H of pixels in the image output with respect to image input.

Having described the present invention in general, the image data processing machine in accordance with an exemplary embodiment will be detailed herein below in reference to FIGS. 1 through 19.

FIG. 1 is a schematic diagram illustrating a digital reproduction apparatus 1 incorporating the image data processing machine.

Referring to FIG. 1, the digital reproduction apparatus 1 includes an image reading unit 2 for reading a document original (not shown) using a one-beam type reading method, a signal processing unit 3 for implementing several image processings onto the image data read by the image reading unit 2, and an image print unit 4 for electro-photographically printing image outputs on a paper sheet (not shown) based on the image data processed by the signal processing unit 3.

The image reading unit 2 is configured to read a document original placed on a contact glass 5 by illuminating light beams emanated from a light source 6 narrowly elongated in the horizontal (main) scanning direction; transmitting light beams reflected by the document original through successive reflection with a first mirror 7, a second mirror 9, and a third mirror 10; and focusing through an imaging optics 12 onto a CCD (charge coupled device) sensor 13 to be photoelectrically transformed.

The light source 6 and first mirror 7 constitute a first scanning unit 8, and the second mirror 9 and third mirror 10 constitute a second scanning unit 11, such that the image reading unit 2 achieves scanning of the document original in the vertical scanning direction by moving the first scanning unit 8 and second scanning unit 11 in the vertical scanning direction with a two-to-one ratio of translational speed. Such an optics system with the cooperating movable scanning mirrors is well known.

The signal processing unit 3 includes an amplifier 14, an ADC (analogue/digital) converter 15, an image processing unit 16, a print control unit 17, and an LD (laser diode) modulation unit 18.

The signal processing unit 3 is configured to amplify by an amplifier 14 the analogue signals acquired through photoelectric conversion by a CCD sensor 13, transform the analogue signals into digital image signals, and thereafter input the digital image signals to the image processing unit 16.

The image processing unit 16 is configured to input resulting signals to the print control unit 17 as raster image data after carrying out several processings on the digital image signals input from ADC 15 such as brightness correction, variable power, and editing.

The print control unit 17 is configured to perform, on the raster image data that are image processed by the image processing unit 16, smoothing processing and thereafter a conversion operation into image data in use for one beam (one line) to be output to the LD modulation unit 18.

The LD modulation unit 18 is configured to modulate a light beam emanated from one of semiconductor lasers included in the signal print unit 4 according to the noted one-line image data.

Incidentally, between the print control unit 17 and LD modulation unit 18, several circuits may additionally be included such, for example, one for limiting the size of images and another for pattern synthesis.

The signal print unit 4 includes an LD unit 20, a cylindrical lens 21, a polygonal mirror 22, an f-θ lens 23, a photosensitive drum 24, and photodetector 25.

The LD unit 20 operates to emanate a laser beam to be modulated by LD modulation unit 18 and transmitted in the direction of the cylindrical lens 21.

The cylindrical lens 21 operates to focus the thus emanated laser beam onto the polygonal mirror 22. The polygonal mirror 22 renders the focused laser beam to constant angular velocity scanning and transmits the focused laser beam toward the f-θ lens 23.

The f-θ lens 23 then operates to correct the laser beam transmitted from the polygonal mirror 22 to be constant linear velocity scanning, illuminates the surface of the photosensitive drum 24 to form a latent image for one line, and also transmits the laser beam to the photodetector 25 for the laser beam to be detected.

The photodetector 25 is placed in front of an effective imaging region in the main scanning direction of the photosensitive drum 24. On detecting the laser beam, the photodetector 25 functions to feedback a synchronization detection pulse signal XDETP to the print control unit 17.

Incidentally, although the present case has been described in which the signal print unit 4 is provided with a semiconductor laser device emanating one laser beam, a semiconductor laser array with plural laser beams may alternatively be used.

The print control unit 17 is configured also to compromise the speed of image data input from the image reading unit 2 with that of data output from the signal print unit 4.

Namely, since the image of the document original on the glass platen is read by CDD sensor 13 by scanning a first scanning unit 8 and a second scanning unit 11 in the vertical scanning direction (FIG. 1), the CCD sensor 13 is adapted to output image data to the signal processing unit 3 one line at a time, in which the image data are obtained as a dot matrix of a line of the data aligned in the main (horizontal) scanning direction and two consecutive lines in the vertical scanning direction.

After resetting an address by a line synchronization signal LSYNC during the data output, since the CCD sensor 13 operates to output one-line image data pixel by pixel in the main scanning direction, the image data are output to the signal processing unit 3 (or print control unit 17) one line at a time with a predetermined line period based on the scanning speed of the first scanning unit 8 and second scanning unit 11, and the reading period of the CCD sensor 13.

On incidence of the laser beam scanned by the polygonal mirror 22 in front of the photosensitive drum 24, the signal print unit 4 is configured to instruct the photodetector 25 to output the synchronization detection pulse signal XDETP, and the print control unit 17 to control the timing of print for the image data input from the image reading unit 2 based on the synchronization detection pulse signal XDETP.

Thereafter, the print control unit 17 carries out a smoothing operation, where a matrix in use for pattern recognition is assumed to amount to nine (9) lines of four (4) frontal neighboring and four (4) rear lines with respect to the line including objective pixel.

Figure 2:
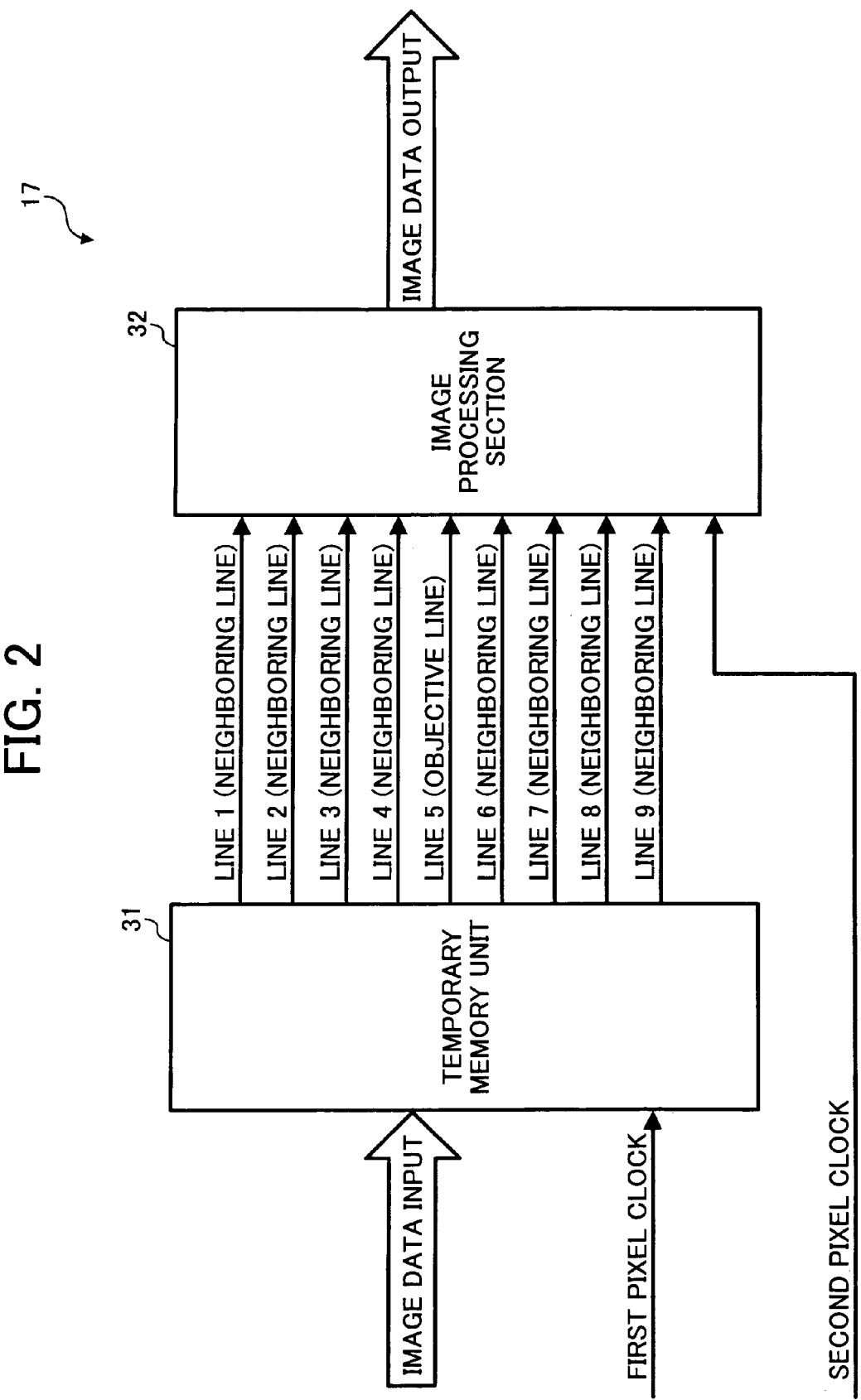
FIG. 2 is a more detailed block diagram illustrating the print control unit of FIG. 1.

Namely, the print control unit 17 includes a temporary memory unit 31 and an image processing section 32 as shown in FIG. 2.

The print control unit 17 is configured to store image data for the nine lines, which are fed from the image processing unit 16, in the temporary memory unit 31 pixel by pixel successively in synchronous with a first pixel clock.

In addition, the digital reproduction apparatus 1 is also adapted to the case of parallel data in which plural sets of data per clock are input through plural signal lines, and image data for nine lines are stored in the temporary memory unit 31 after implementing the parallel to serial conversion.

The image processing section 32 is configured to simultaneously readout the image data for nine lines stored in the temporary memory unit 31 in synchronous with a second pixel clock during the time period of inputting one line image data.

Incidentally, the second pixel clock in the present embodiment is adapted to readout image data from the temporary memory unit 31 by pixel for each of nine lines.

As shown in FIGS. 3 through 7, the process operations of reading out the noted image data from temporary memory unit 31 by pixel unit are suitably selected and activated by every certain pulse of the second pixel clock.

Figure 3B:
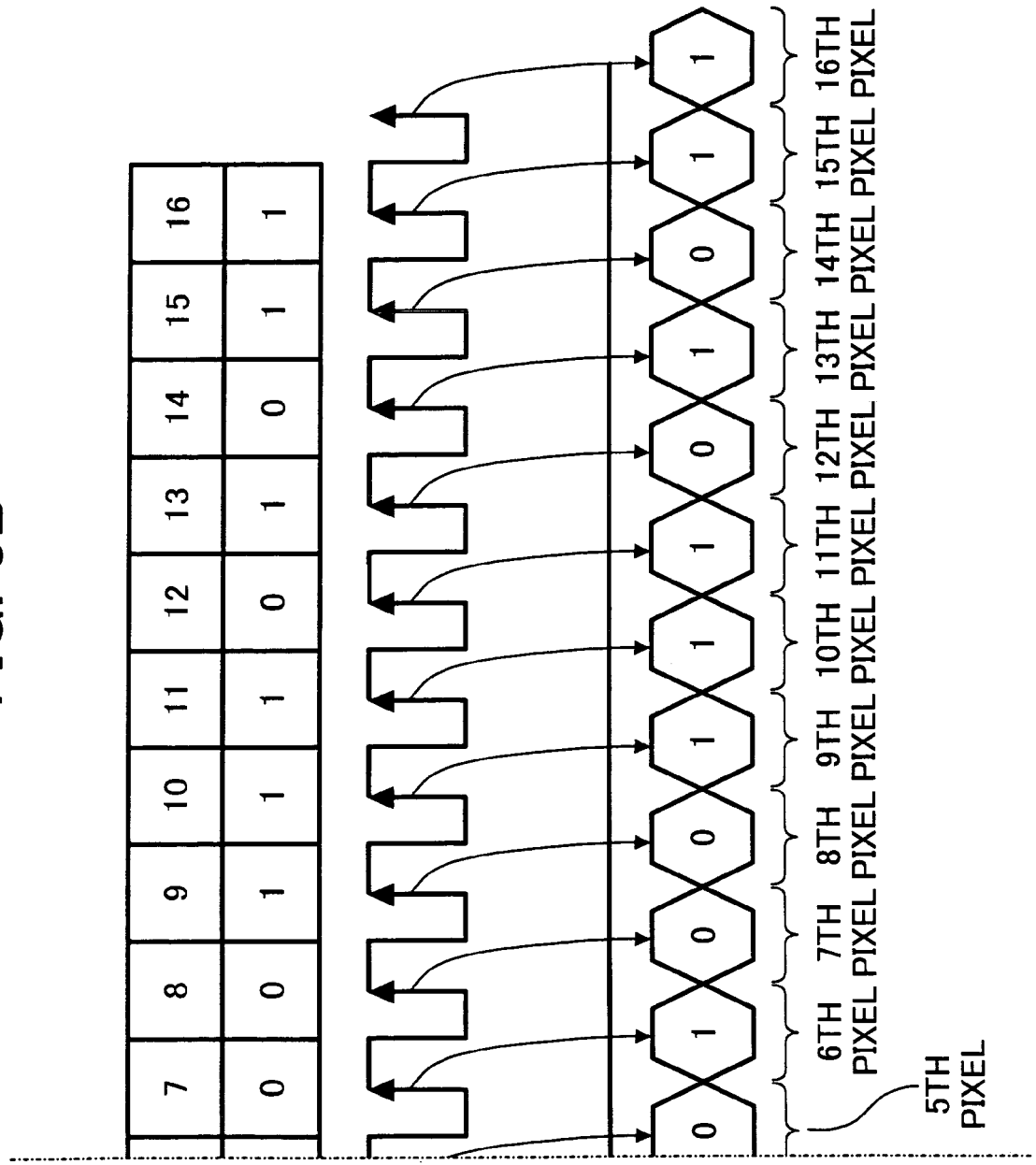
FIG. 3 is a timing diagram illustrating that the readout of image data from the temporary memory unit 31 by pixel unit is carried out in synchronous with each pulse of the second pixel clock.

Thus, FIG. 3 is a timing diagram illustrating that the readout step of image data from the temporary memory unit 31 by pixel unit is carried out in synchronous with each pulse of the second pixel clock.

Figure 4B:
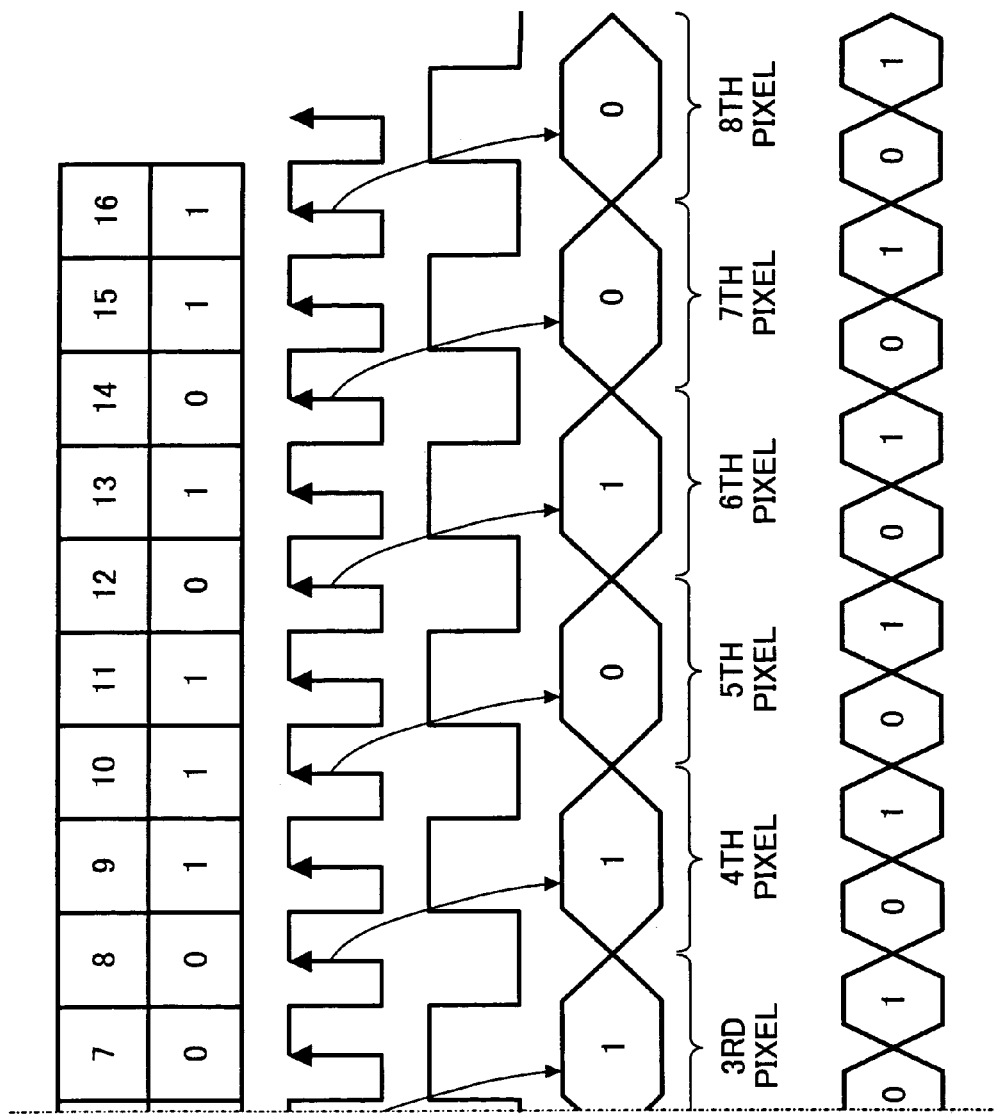
FIG. 4 is a further timing diagram illustrating that the readout of image data from the temporary memory unit by pixel unit is carried out in synchronous with every other pulse of the second pixel clock.

FIG. 4 is a further timing diagram illustrating that the readout step of image data from the temporary memory unit 31 by pixel unit is carried out in synchronous with every other (every second) pulse of the second pixel clock.

Similarly, FIG. 5 is a timing diagram illustrating that the readout step of image data is carried out in synchronous with every third pulse of the second pixel clock.

Figure 7B:
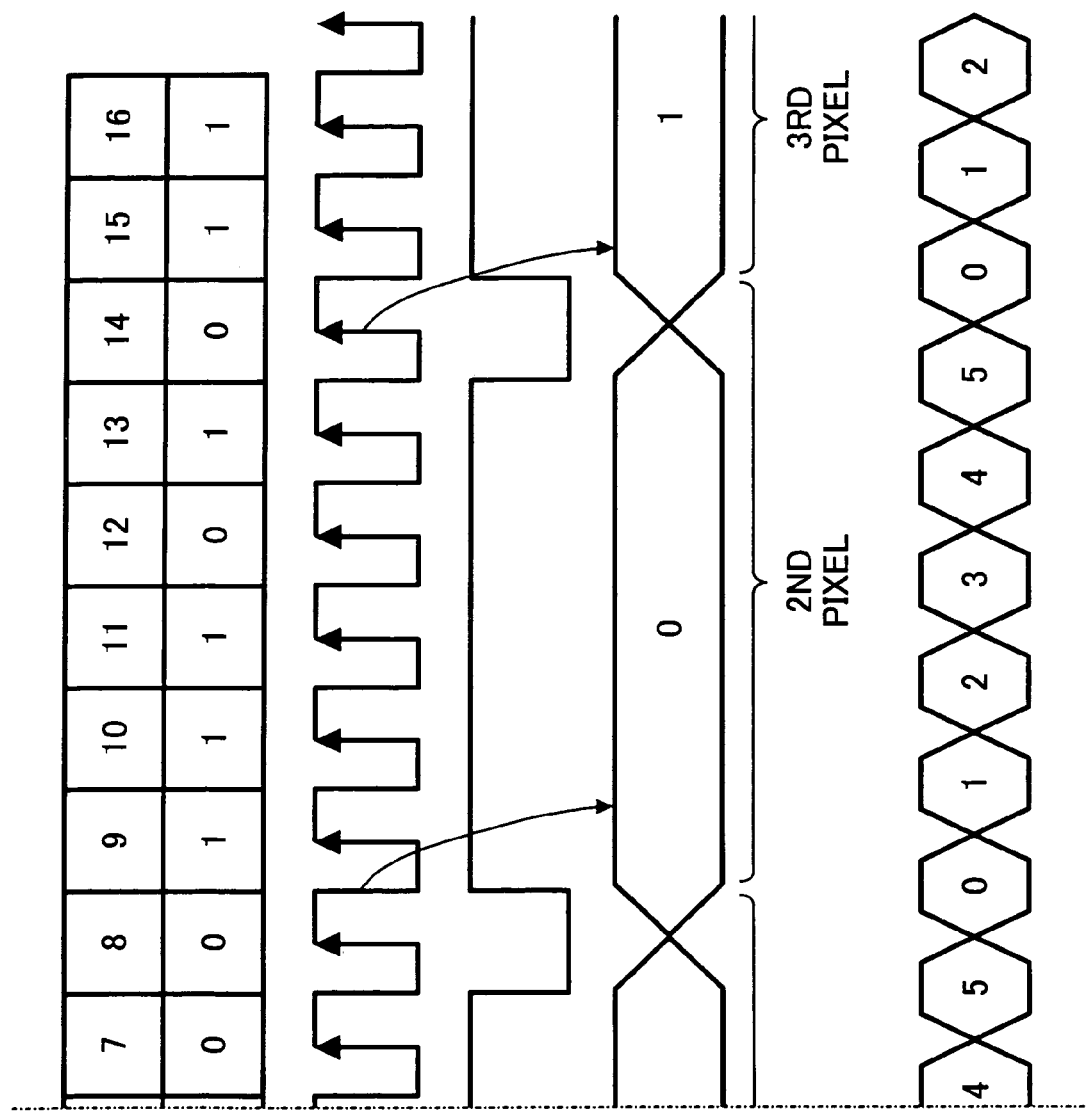
FIG. 7 is a timing diagram illustrating that the readout of image data is carried out in synchronous with every sixth pulse of the second pixel clock.

FIG. 6 is a timing diagram illustrating that the readout step of image data is carried out in synchronous with every fourth pulse, and FIG. 7 is a timing diagram illustrating that the readout step of image data is carried out in synchronous with every sixth pulse of the second pixel clock.

When the resolution of 1200 dpi is assumed for inputting image by a laser beam during the electrophotographic process carried out in the image print unit 4, the resolution is obtained as follows for the cases illustrated in FIGS. 3 through 7, respectively.

Namely, FIG. 3 illustrates image data input from the image processing unit 16 to the print control unit 17 are assumed to be binary data with an input resolution of 1200 dpi.

The above mentioned process operation is then carried out such that the image data is readout from the temporary memory unit 31 by pixel unit in synchronous with every pulse of the second pixel clock, and that the reading out of image data is carried out successively by pixel unit in the clock timing of a present frequency of the second pixel clock for inputting 1200 dpi data by the print control unit 4.

As a result, no change takes place in the number of image pixels for outputting by the print control unit 17, that is, the resolution of 1200 dpi is therefore maintained.

FIG. 4 illustrates image data input from the image processing unit 16 to the print control unit 17 are assumed to be binary data with an input resolution of 600 dpi.

In a manner similar to FIG. 3, the above mentioned process operation is carried out such that the image data is readout from the temporary memory unit 31 by pixel unit in synchronous with every other pulse of the second pixel clock, and that the data-out is carried out successively by pixel unit in the clock timing of twice the frequency of the second pixel clock for inputting 1200 dpi data by the print control unit 4.

As a result, the number of pixels output by the print control unit 17 is increased by a factor of two compared with the image data input of 600 dpi and the resolution of output image data is altered to 1200 dpi.

FIG. 5 illustrates image data input from the image processing unit 16 to the print control unit 17 are assumed to be binary data with an input resolution of 400 dpi.

In a manner similar to those mentioned above, the above mentioned process step is carried out such that the image data is readout from the temporary memory unit 31 by pixel unit in synchronous with every third pulse of the second pixel clock, and that the data-out is carried out successively by pixel unit in the clock timing of three times the frequency of the second pixel clock for inputting 1200 data by the print control unit 4.

As a result, the number of pixels output by the print control unit 17 is increased by a factor of three compared with the image data input of 400 dpi and the resolution of output image data is altered to 1200 dpi.

FIG. 6 illustrates image data input from the image processing unit 16 to the print control unit 17 that are assumed to be binary data with an input resolution of 300 dpi.

In a manner similar to those mentioned above, the above mentioned process operation is carried out such that the image data is readout from the temporary memory unit 31 by pixel unit in synchronous with every fourth pulse of the second pixel clock, and that the data-out is carried out successively by pixel unit in the clock timing of four times the frequency of the second pixel clock for inputting 1200 dpi data by the print control unit 4.

As a result, the number of pixels output by the print control unit 17 is increased by a factor of four compared with the image data input of 300 dpi and the resolution of output image data is altered to 1200 dpi.

FIG. 7 illustrates image data input from the image processing unit 16 to the print control unit 17 that are assumed to be binary data with an input resolution of 200 dpi.

In a manner similar to those mentioned above, the above mentioned process operation is carried out such that the image data is readout from the temporary memory unit 31 by pixel unit in synchronous with every sixth pulse of the second pixel clock, and that the data-out is carried out successively by pixel unit in the clock timing of six times the frequency of the second pixel clock for inputting 1200 dpi data by the print control unit 4.

As a result, the number of pixels output by the print control unit 17 is increased by a factor of six compared with the image data input of 200 dpi and the resolution of output image data is altered to 1200 dpi.

In addition, by implementing the readout steps as illustrated in FIGS. 3 through 7 according to the second clock, the image data for nine lines readout from the temporary memory unit 31 can be output simultaneously to the image processing section 32 with a window 42, which will be described later on in reference to FIGS. 8 and 9.

The image processing section 32 is configured, in order to reduce the jaggies on contour lines of an oblique line or a circular arc, to form a matrix with the data for the rows of 13 pixels in the main scanning direction and for nine lines in the vertical scanning direction, extract characteristic features of the objective pixel based on several values of the objective pixel and neighboring pixels, and determine characteristic values of the objective pixel.

In addition, the image processing section 32 is also configured to convert the values of all pixels into multi-valued data with plural bits by implementing a smoothing process in synchronous with each pulse of the second pixel clock.

Figure 8:
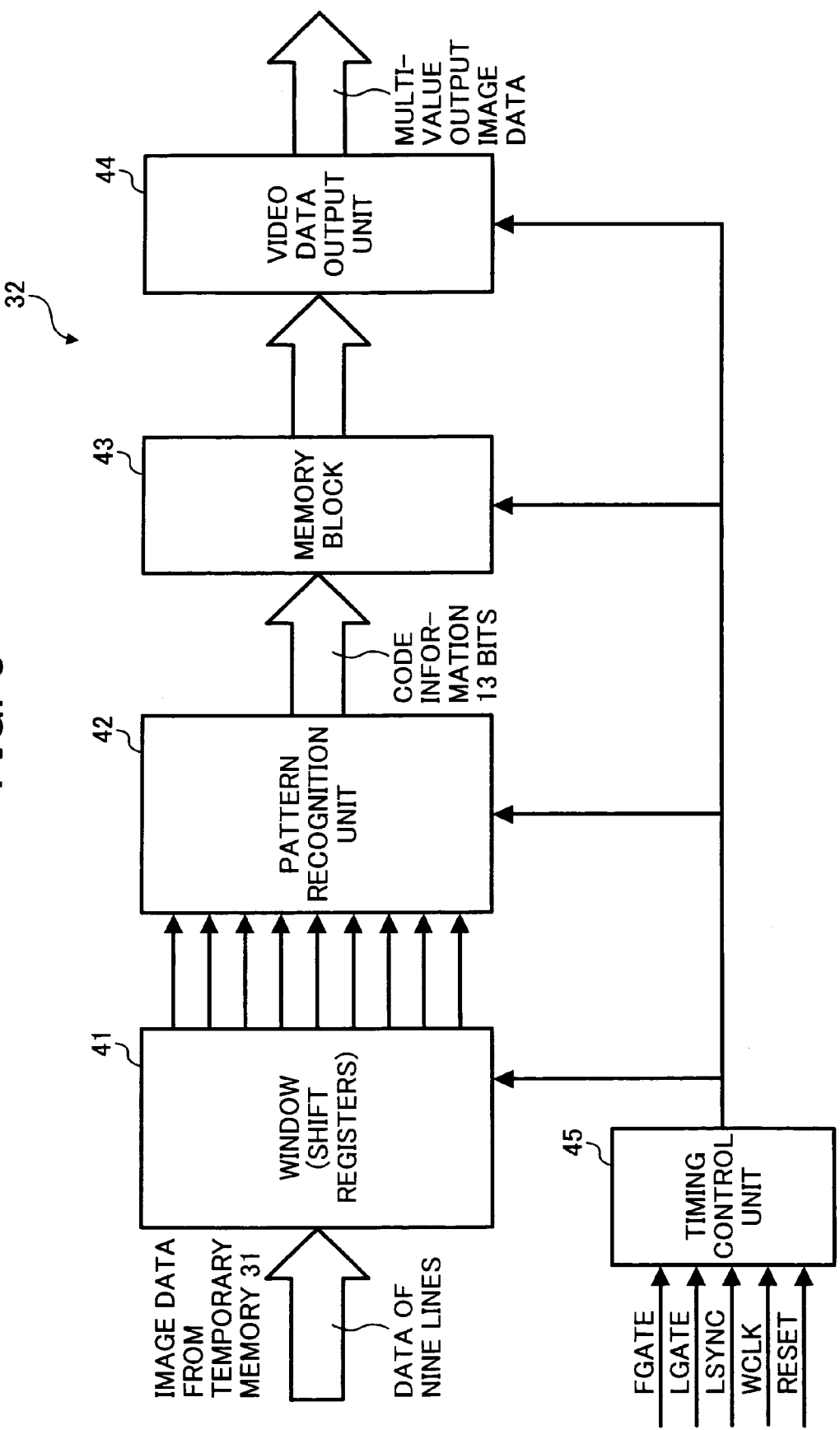
FIG. 8 is a detailed block diagram illustrating the image processing section of FIG. 2.

Namely, as illustrated in the block diagram of FIG. 8, the image processing section 32 includes at least a window 41, a pattern recognition unit 42, a memory block 43, a video data output unit 44, and a timing controller 45 for assuming the timing control of the above noted units.

Figure 9:
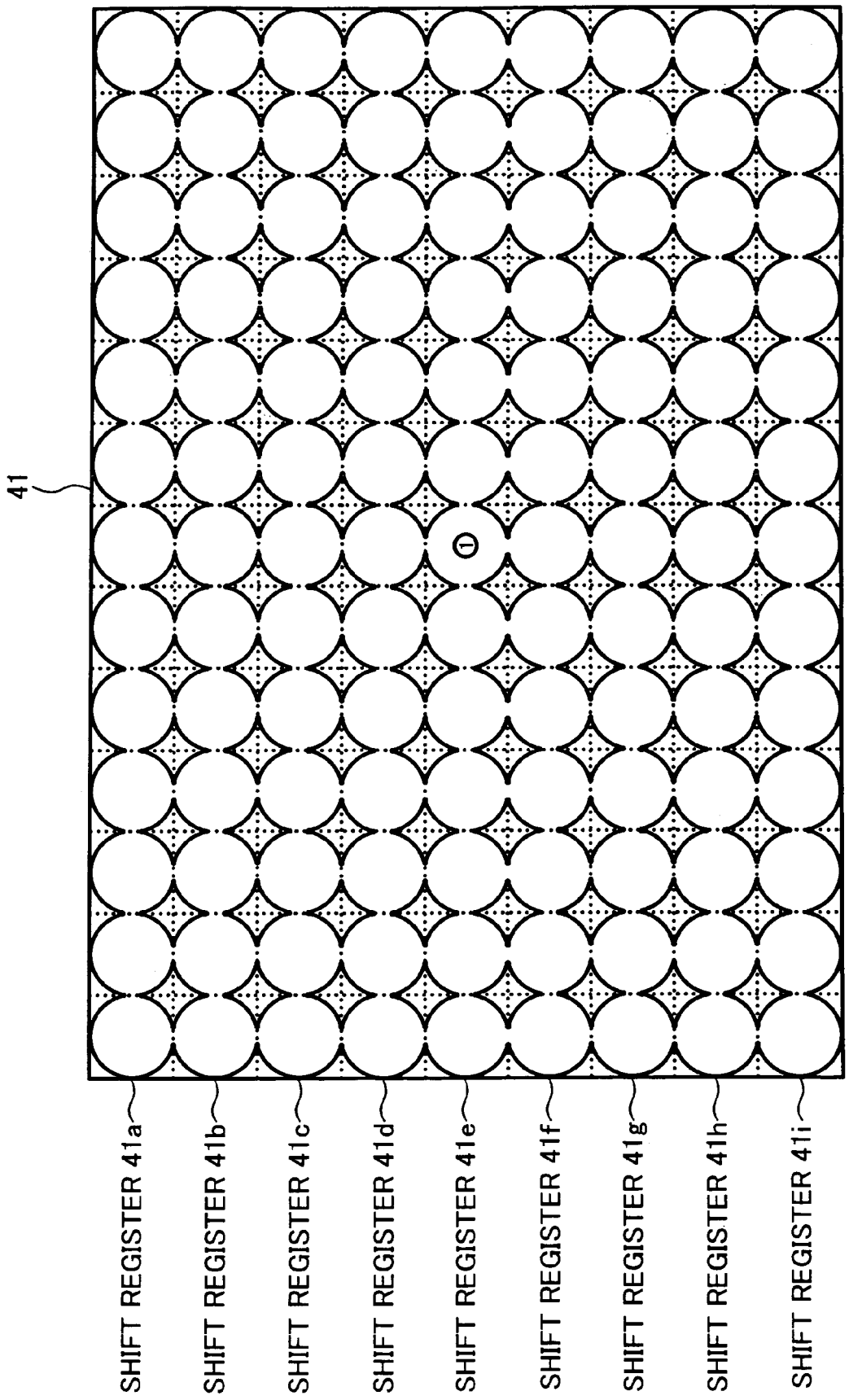
FIG. 9 is a drawing illustrating details of the window of FIG. 8.

The window 41 is adapted, as shown in FIG. 9, to constitute a window used for pattern detection, which is provided with shift registers 41a through 41i corresponding to image data of the nine lines each serially connected to be capable of shifting data for 3 pixels aligned in the main scanning direction.

It should be noted that the data output from the temporary memory unit 31 are output for nine lines to the image processing section 32.

The timing controller 45 is configured to output several signals such as:
 an FGATE signal for defining the time length for inputting one-page image data in the vertical scanning direction,
 an LGATE signal for defining the data inputting time for one-line image data in the main direction,
 an LSYNC for specifying the start and finish timings for outputting the data for each line, and
 WCLK and RESET signals for instructing the timing of data-output and data-input for each unit.

In addition, the timing controller 45 is also configured to generate clock signals and other similar signals necessary for bringing to synchronize the units 41 through 44 of FIG. 8 with each other.

In the window 41 included in the image processing section 32, the seventh pixel from the left on the line of the shift registers 41e of FIG. 9 (i.e., the pixel marked by ① in FIG. 9) is assigned to the location for storing the objective pixel.

The image processing section 32 then operates to successively extract the image data of the window 41 centering around the objective pixel by instructing to shift image data in the shift resisters 41a through 41i by one pixel in order and thereby changing successively the objective pixel with respect to the image processing section 32.

The steps of the above noted window data extraction in the shift registers 41a and 41i will be described as follows in reference to FIGS. 3 through 7.

Referring to FIG. 3, a step of outputting image data from the temporary memory unit 31 is carried out by pixel unit in synchronous with every pulse of the second pixel clock, and the image data in the shift registers 41a through 41i included in the image processing section 32 are also shifted pixel by pixel successively in synchronous with every pulse of the second pixel clock so that the objective pixel changes successively with respect to the image processing section 32.

Referring now to FIG. 4, a further operation of outputting image data from the temporary memory unit 31 is carried out by pixel unit in synchronous with pulses of the second pixel clock.

In this case, however, the period of outputting data is set to coincide with every other pulse so that the image data in the shift registers 41a through 41i included in the image processing section 32 are also shifted pixel by pixel successively in synchronous with every other (every second) pulse of the second pixel clock, and the objective pixel changes successively with respect to the image processing section 32.

Referring to FIG. 5, a step of outputting image data from the temporary memory unit 31 in a manner similar to FIGS. 3 and 4 is carried out by pixel unit in synchronous with pulses of the second pixel clock.

In this case, however, the period of outputting data is set to coincide with every third pulse so that the image data in the shift registers 41a through 41i included in the image processing section 32 are also shifted pixel by pixel successively in synchronous with every third pulse of the second pixel clock, and the objective pixel changes successively with respect to the image processing section 32.

Referring to FIG. 6, a step of outputting image data from the temporary memory unit 31 is carried out similarly by pixel unit in synchronous with pulses of the second pixel clock.

In this case, however, the period of outputting data is set to coincide with every fourth pulse so that the image data in the shift registers 41a through 41i included in the image processing section 32 are also shifted pixel by pixel successively in synchronous with every fourth pulse of the second pixel clock, and the objective pixel changes successively with respect to the image processing section 32.

Referring to FIG. 7, a step of outputting image data from the temporary memory unit 31 is carried out similarly by pixel unit in synchronous with pulses of the second pixel clock.

In this case, however, the period of outputting data is set to coincide with every sixth pulse so that the image data in the shift registers 41a through 41i included in the image processing section 32 are also shifted pixel by pixel successively in synchronous with every sixth pulse of the second pixel clock, and the objective pixel changes successively with respect to the image processing section 32.

By way of example, FIGS. 10A through 10C illustrate the noted one-pixel shift implemented successively on the shift registers 41a through 41i included in the image processing section 32 for forming the window 41 so that the image data is shifted by one pixel successively with respect to the image processing section 32.

FIGS. 10A through 10C illustrate the relationship between image data and the timing with the pixel clock.

Among the image data input from the image processing unit 16 of FIG. 2, FIG. 10A shows image data at a leading edge (the time T1 of FIG. 10C) in the shift registers 41a through 41i for forming the window 41 of FIG. 9. Also shown in FIG. 10B are image data at a second leading edge (the time T2 of FIG. 10C) in the shift registers 41a through 41i for forming the window 41 of FIG. 9.

In addition, by shifting image data in the shift registers 41a through 41i for forming the window 41 successively pixel by pixel, the image processing section 32 is capable of extracting dot information of each pixel as the objective pixel from the very top down the line.

It is noted in this context, FIGS. 10A through 10C correspond to the timing diagram of FIG. 3 described earlier for illustrating the readout step of image data.

In addition, FIGS. 10A through 10C also correspond to FIGS. 4 through 7 as follows.

In the case illustrated in FIG. 4, image data in the shift registers 41a through 41i for forming the window 41 for the image processing section 32 are shifted pixel by pixel successively in every other period of the second pixel clock so that dot information of each pixel from the top of the line and on can be extracted by the image processing section 32.

The extraction (or alteration) of dot information is therefore maintained for the time length of two periods of the second pixel clock.

Similarly, in the case of FIG. 5, image data in the shift registers 41a through 41i for forming the window 41 for the image processing section 32 are shifted pixel by pixel successively once in every third period of the second pixel clock so that dot information of each pixel from the top of the line and on can be extracted by the image processing section 32.

The extraction (or alteration) of dot information is maintained for the time length of three periods of the second pixel clock.

In the case of FIG. 6, image data in the shift registers 41a through 41i for forming the window 41 for the image processing section 32 are shifted pixel by pixel successively once in every fourth period of the second pixel clock so that dot information of each pixel from the top of the line and on can be extracted by the image processing section 32.

The extraction (or alteration) of dot information is maintained for the time length of four periods of the second pixel clock.

In the case of FIG. 7, image data in the shift registers 41a through 41i for forming the window 41 for the image processing section 32 are shifted pixel by pixel successively once in every six periods of the second pixel clock so that dot information of each pixel from the top of the line and on can be extracted by the image processing section 32.

The extraction (or alteration) of dot information is maintained for the time length of six periods of the second pixel clock.

Referring again to FIG. 8, the pattern recognition unit 42 is configured, based on the dot information of objective pixel extracted by the window 41, to recognize the information of a target pixel (objective pixel) and neighboring pixels, particularly the characteristics of a line segment feature for the boundary with black and white pixels in the image data, and to output the result of recognition to the memory block 43 after converting to code information in a predetermined format (for example, 13 bits code information).

In addition, code information output from the pattern recognition unit 42 is used as the read address of the memory block 43 during image processing (smoothing).

Figure 11:
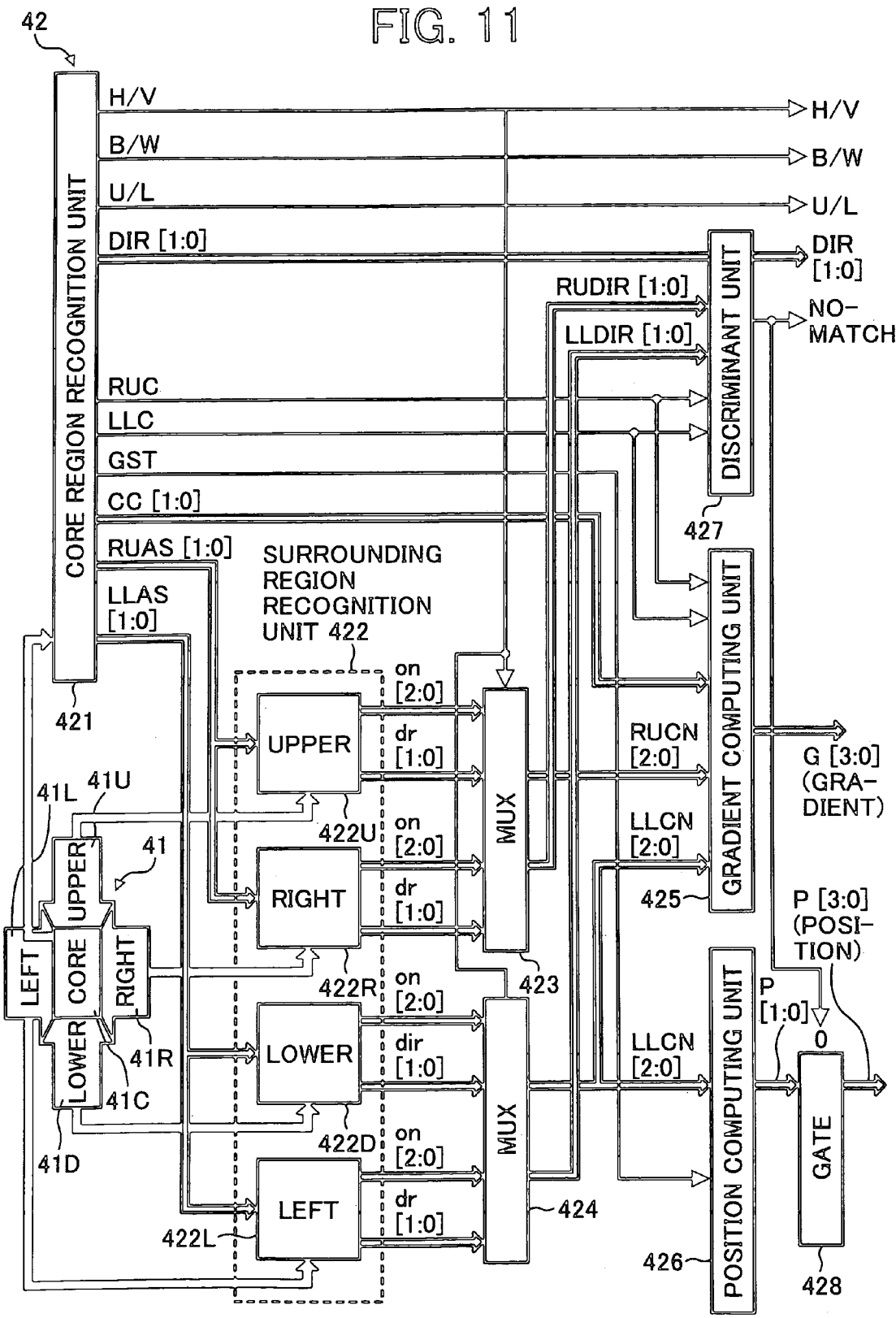
FIG. 11 is a more detailed block diagram illustrating the window and pattern recognition unit of FIG. 8 according to the exemplary embodiment of the invention.

The window 41 and the pattern recognition unit 42 are illustrated in detail in FIG. 11.

The window 41 as a sample window is divided into five regions as a core region 41C of 3×3 bits at the center; and a lower region 41D below, an upper region 41U above, a left region 41L on the left side of, and a right region 41R on the right of, the core region 41C.

In addition, these regions 41D, 41U, 41L and 41R are each divided further into three sub-regions (not shown). The dot at the very center of the core region 41C is the objective dot (target dot) to be subjected to corrections.

If a pattern for the line segment detected in the core region 41C is one close to horizontal, or with a gradient of a half (½) or less, one or both of the left region 41L and the right region 41R are further examined.

In contrast, if the pattern for the line segment detected in the core region 41C is one close to vertical, or with a gradient of a half (½) or larger, one or both of the upper region 41U and the lower region 41L are examined.

The pattern recognition unit 42 includes a core region recognizing unit 421, a surrounding region recognizing unit 422, a gradient computing unit 425, a position computing unit 426, a discriminant unit 427, and a gate 428.

The surrounding region recognition unit 422 further includes an upper region recognizing unit 422U, a right region recognizing unit 422R, a lower region recognizing unit 422D, and a left region recognizing unit 422L.

The core region recognizing unit 421 is configured to extract and acquire the data of respective dots in the core region 41C; implement necessary decision, measurements and others on the objective dot at the center; and output to the memory block 43 several signals such as H/V (for indicating the line segment being close to either horizontal or vertical); and B/W (for indicting the objective dot is placed either above (right) or below (left) the line segment).

The core region recognizing unit 421 is also configured to output several signals such as,
- to the discriminant unit 427 and gradient computing unit 425, RUC as a flag for indicating whether the right region 41R or upper region 41U is to be examined with respect to the pattern in the core region 41C and LLC as a further flag for indicating whether the left region 41L or lower region 41D is to be examined with respect to the pattern in the core region 41C;
- to the position computing unit 426, GST for indicating whether the objective dot is a starting point for computing the gradient;
- to the gradient computing unit 425, CC [1:0] as two-bit information for indicating the number of continuous dots on a line segment in the core region;
- to the upper region recognizing unit 422U and right region recognizing unit 422R, RUAS [1:0] as two-bit information specifying one of the three sub-regions in either the right region 41R or upper region 41U; and
- to the lower region recognizing unit 422D and left region recognizing unit 422L, LLAS [1:0] specifying one of the three sub-regions in either the lower region 41D or left region 41L.

The surrounding region recognizing unit 422 is configured to instruct the upper region recognizing unit 422U, right region recognizing unit 422R, lower region recognizing unit 422D and left region recognizing unit 422L to extract and acquire the data of respective dots in the specified sub-regions of core region 41C, right region 41R, and left region 41L in the window 41, respectively, and to output to the multiplexer 423 or 424, cn [2:0] for indicating the number of continuous dots in the region and dir [1:0] for indicating the direction of inclination (or gradient) of the line segment.

The multiplexer 423 is configured to selectively acquire the information from the upper region recognizing unit 422U in the case when the signal H/V input from the core region recognizing unit 421 is "0", while to acquire the information from right region recognizing unit 422R in the case when H/V is "1", to output RUCN [2:0] as the number of continuous dots in respective sub-regions to the gradient computing unit 425, and to output RUDIR [1:0] as the direction of inclination of the line segment to the discriminant unit 427.

The multiplexer 424 is configured to selectively acquire the information from the lower region recognizing unit 422D in the case when the signal H/V input from the core region recognizing unit 421 is "0", while to acquire the information from left region recognizing unit 422L in the case when H/V is "1", to output LLCN [2:0] as the number of continuous dots in respective sub-regions to the gradient computing unit 425 and position computing unit 426, and to output LLDIR [1:0] as the direction of inclination of the line segment to the discriminant unit 427.

The discriminant unit 427 is configured to decide whether any dot correction is required according to the noted code information DIR [1:0], RUDIR [1:0] and LLDIR [1:0], and signals RUC and LLC, in a case when a dot correction is decided to be made, output to the memory block 43 the DIR [1:0] code information for indicating the direction of inclination of the line segment to be corrected, and to change a discriminant signal NO-MATCH to be input to the memory block 43 and gate 428 to be "1".

On receiving the "1" discriminant signal NO-MATCH, the gate 428 functions to close, whereas the outputting operation from the position computing unit 426 to phase information P [3:0] is terminated.

The gradient computing unit 425 is adapted to receive code information CC [1:0], RUCN [2:0] and LLCN [2:0] for indicating the number of continuous dots, the noted code information DIR [1:0], RUDIR [1:0] and LLDIR [1:0], and the signals RUC and LLC, to compute, as the number of continuous dots, the magnitude of inclination (GRADIENT) of the line segment pattern recognized according to the noted code information and the signals, and to output to the memory block 43 as code information G [3:0].

The position computing unit 426 is adapted to receive code information LLCN [2:0] for indicating the number of continuous dots in the left region 41L or lower region 41D, and the signal GST, to compute the position of the objective dot (POSITION) according to the noted code information and the signal, and to output to the memory block 43 as code information P [3:0] (P=0~3).

Although the size of the core region has been described as 3×3 dots, it should be noted other bit construction such as, for example, 5×5 dots, may alternatively be adopted.

Referring again to FIG. 12, the memory block 43 of FIG. 8 includes a pattern memory 431, a multiple density mode image pattern generator 432, and a selector 433.

The multiple density mode image pattern generator 432 will be abbreviated as pattern generator in some occasions.

In the pattern memory 431, four (4)-bit correction data in use for smoothing and for single density mode are stored in advance and 13-bit code information as an address is also input from the pattern recognition unit 42.

The pattern memory 431 is also configured to readout the correction data according to the code information from the pattern recognition unit 42 as the address, and output to the selector 433 the image data for driving the laser unit as a corrected dot pattern.

Incidentally, the correction data for smoothing stored in advance in the memory block 43 are provided with the data corresponding to the code information from the pattern recognition unit 42 prior to implementing the smoothing of image data.

In addition, the correction data in the memory block 43 may also be acquired by being selectively loaded from a ROM (read only memory) by a MPU (micro processing unit) and CPU (central processing unit) in the digital reproduction apparatus 1, or downloaded from a host computer, whereby the contents of correction data can be modified with relative ease considering the data to be corrected.

And, as an interface (I/F) for setting the correction data, a mechanism for writing the data stored in an inside memory included in the digital reproduction apparatus 1 by a CPU can be provided.

In the multiple density mode image pattern generator (or multiple density mode image pattern generator) 432, the 13-bit code information is input from the pattern recognition unit 42 and main-vertical scanning multiple density code.

The multiple density mode image pattern generator 432 is configured to generate correction data (4-bits), which are set in advance coursing to the noted code information and the main-vertical scanning multiple density code, and output to the selector 433 as an image pattern for drive the laser device.

A discriminant section 427 in the pattern recognition unit 42 is configured to replace some of the bits of plural-bit code information with a characteristic value, in which the code information indicates characteristics of the line segment feature of either one-pixel line of black pixel in a horizontal line segment, for which the decision has been made not to require any correction to the pixel, or the uppermost or the lowermost black pixel having a vertical width of two pixels or more, that is, black pixels that are placed in the boundary region between the white and black pixel regions among the image data expanded into a bitmap, but are not included in the constituents of jagged portion of the oblique line segment.

Image path selection signals are input to the selector 433 to select the pattern memory 431 in the case of a single density mode, while to select the multiple density mode image pattern generator 432 in the case of a double density mode.

The selector 433 is configured, according to the image path selection signals, to select the image data from the pattern memory 431 to be output to video data output unit 44 in the case of the single density mode, while to select image data from the multiple density mode image pattern generator 432 to be output to the video data output unit 44 in the case of the double density mode.

More specifically, in the mode described earlier referring to FIG. 3 (which is hereinafter referred to as single density mode), the pattern memory 431 is adapted to readout the correction data (4 bits) stored in advance according to the code information (13 bits) output from the pattern recognition unit 42 as the address, and output to selector 433 the image data for driving the laser source, and the selector 433 operates to select image data from the pattern memory 431 as a corrected dot pattern and output to the video data output unit 44.

The operation modes described in reference to FIGS. 4 through 7 are hereinafter referred to as multiple density modes such as a double density mode illustrated in FIG. 4, a triple density mode illustrated in FIG. 5, a quadruple density mode illustrated in FIG. 6, and a sextuple density mode illustrated in FIG. 7.

In these operations modes, the multiple density mode image pattern generator 432 is adapted to generate correction data (4-bits), which are set in advance according to the noted code information and the main-vertical scanning multiple density code, and to be output to the selector 433 as an image pattern for drive the laser device.

The selector 433 operates to select image data from the multiple density mode image pattern generator 432 as a dot pattern and to be output to the video data output unit 44.

In this context, it should be added the term, main-vertical scanning multiple density code, the variable power operations are carried out onto the pixel specified by the noted code number in the main and vertical scanning directions.

Therefore, in the main scanning double density mode illustrated in FIG. 4, the operations are carried out by repeating two patterns such as indicated as 0→1→0→1→0 . . . in the column of the main scanning multiple density mode;

in the main scanning triple density mode illustrated in FIG. 5, the operations are carried out by repeating three patterns such as indicated as 0→1→2→0→1→2→0 . . . in the column of the main scanning multiple density mode;

in the main scanning quadruple density mode illustrated in FIG. 6, the operations are carried out by repeating four patterns such as indicated as 0→1→2→3→0→1→2→3→0 . . . in the column of the main scanning multiple density mode; and in the main scanning sextuple density mode illustrated in FIG. 7, the operations are carried out by repeating six patterns such as indicated as 0→1→2→3→4→5→0→1→2→3→4→5→0 . . . in the column of the main scanning multiple density mode.

Although no drawing is shown with respect to the vertical scanning direction herein above, the vertical scanning direction multiple density code specifies the number of the line for which the variable power operation is implemented in a manner similar to the multiple density mode of FIG. 3.

And, the selector 433 is adapted to output the corrected data to the video data output unit 44 as the information generated by dividing the turn-in time of laser device into its multiple for each second pixel clock (binary PWM signal output in the present case) or multi-valued information.

The video data output unit 44 is configured to convert corrected data, which are output pixel by pixel in each second pixel clock from memory block 43, or selector 433, into the image data format, to output resultant data to LD modulation unit 18 of FIG. 1, and to implement the on/off and power controls of LD device in the LD modulation unit 18 to be recorded onto the photosensitive drum 24.

The digital reproduction apparatus 1 in accordance with the exemplary embodiment can therefore have the following capability. Although the number of pattern code information is the same, which results from extracting the characteristics of the objective pixel based on several values related to the objective and surrounding pixels, as long as the size of the window 41 included in the print control unit 17 is the same, the difference in image qualities decreases in consideration of the resolution of input image data to be subjected to pattern recognition and output image data to be printed out as a final visual image on a print sheet.

For example, in the case when binary image data with 1200 dpi resolution are input from the temporary memory unit 31 to window 41 in the image processing section 32, and when the thus input image data are output after smoothing by print control unit 17 as multi-valued image data with the same 1200 dpi resolution (that is, single density mode), the image qualities can be improved by/the effect from binary to multi-valued conversion because of the concomitant effect of reducing jaggies.

In this smoothing process (binary ⇒multi-value conversion process), the image data conversion is carried out according only to the pattern code information obtained from several values of the objective and surrounding pixels, in which the conversion is carried out by the pattern memory 431.

Figure 12:
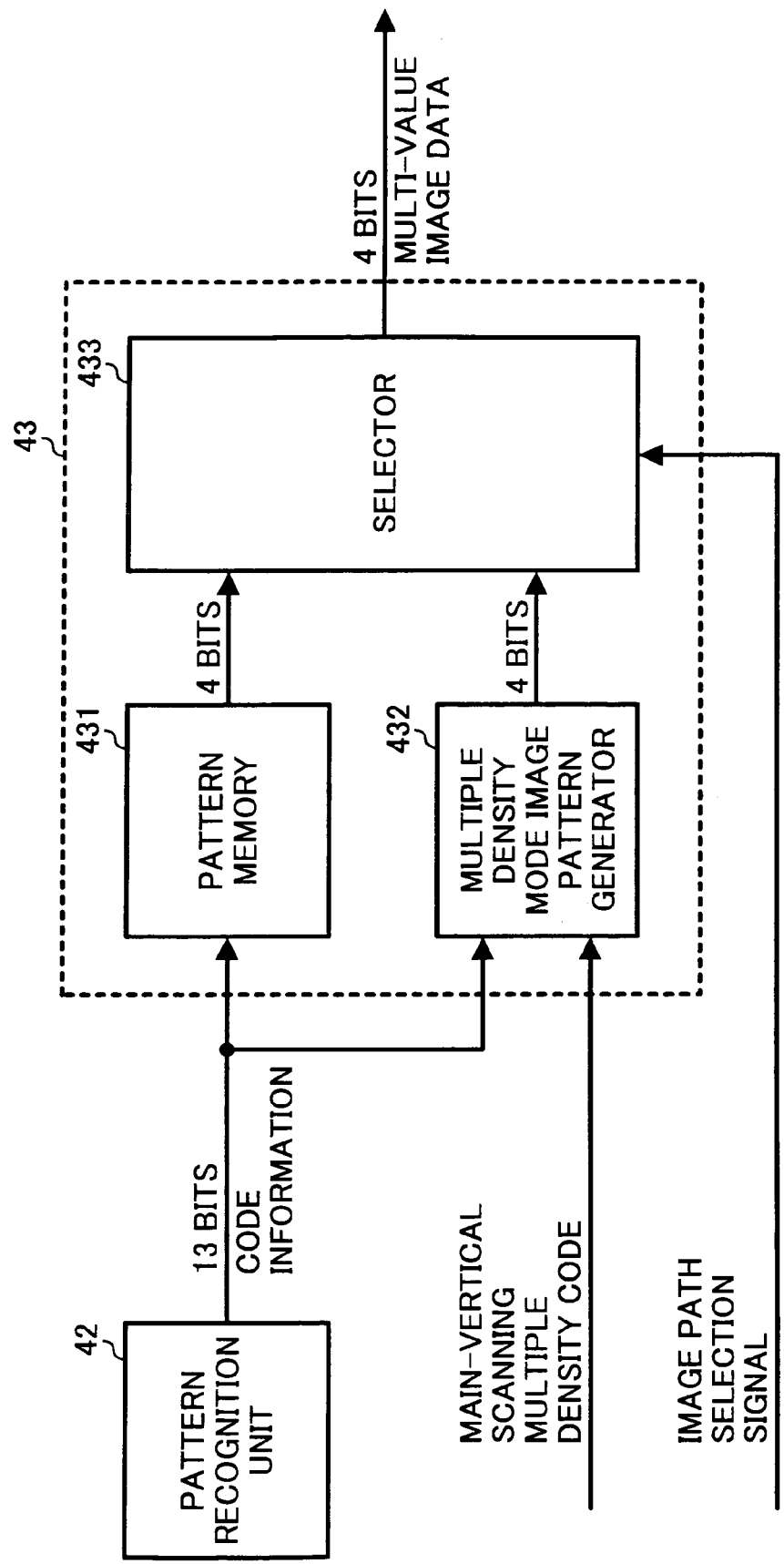
FIG. 12 is a block diagram illustrating details of the memory block of FIG. 8.
Figure 13:
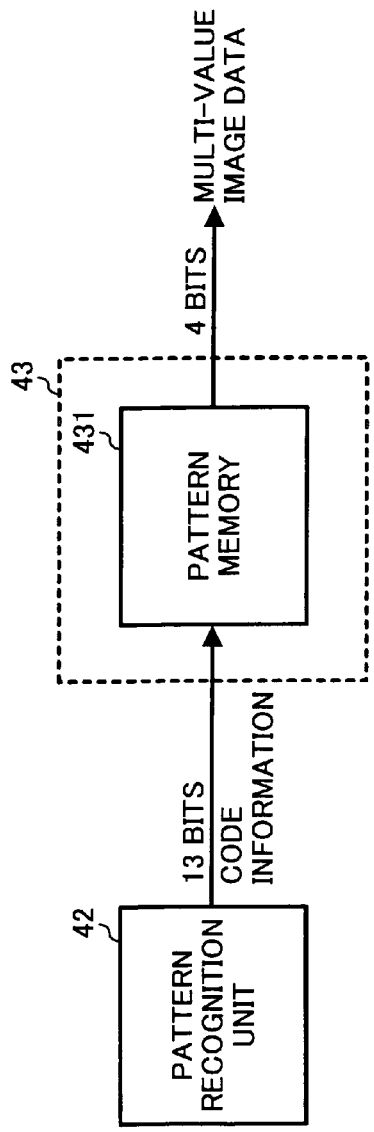
FIG. 13 is a block diagram including at least a pattern memory for forming the memory block of FIG. 8.

In the case described above in which only single density mode processing is required, the block memory 43 of FIG. 12 can be formed with only the pattern memory 431 as shown in FIG. 13.

As the memory size of the pattern memory 431 during the process, 32 kbits (8 kbits for address and 4 bits for data) are required, since the specification of the memory has to include 4 bits information for each address specified by binary 13 bits pattern code information of FIG. 13 noted earlier.

Figure 14:
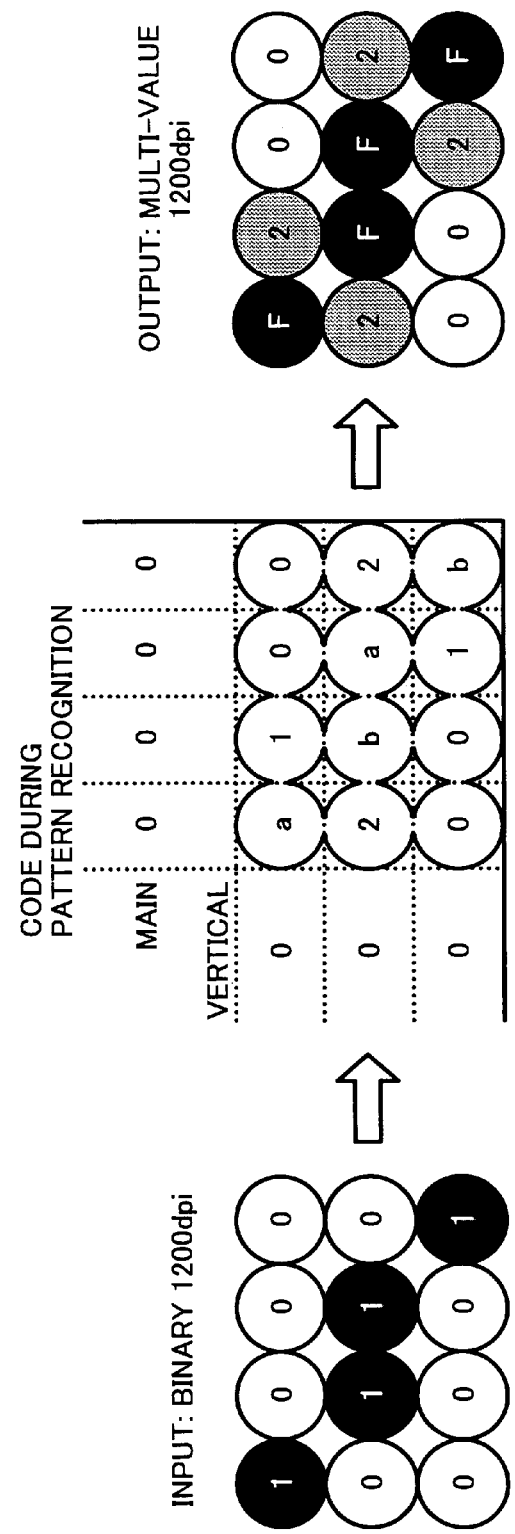
FIG. 14 illustrates a single density mode processing implemented by the pattern memory of FIGS. 12 and 13.

The details of single density mode processing are shown in FIG. 14, in which 1200 dpi binary image data of only the data "0" or "1" are converted by the pattern recognition with the window 41 into the code information for respective pixel during image input; while, during image output, image data are output as 1200 dpi multi-valued data.

In addition, although the value "0" is shown in FIG. 14 in every column of main-vertical scanning multiple density code, this is rather unnecessary information for smoothing process since the density mode is single in this case.

In contrast to the single density mode mentioned above, in the case when binary image data with 400 dpi resolution are input from the temporary memory unit 31 to window 41 in the image processing section 32, and when the thus input image data are output after smoothing by print control unit 17 as multi-valued image data with the same 1200 dpi resolution (that is, triple density mode), the image qualities can be improved by the effect from binary to multi-valued conversion because of the concomitant effect of reducing jaggies.

In this smoothing process (binary ⇒multi-value conversion process), however, the image data conversion is carried out according only to the main-vertical scanning multiple density code generated during the process of converting the resolution from 400 dpi to 1200 dpi in addition to the earlier noted pattern code information obtained from the objective and surrounding pixels, in which the conversion is then carried out by the pattern memory 431.

Figure 15:
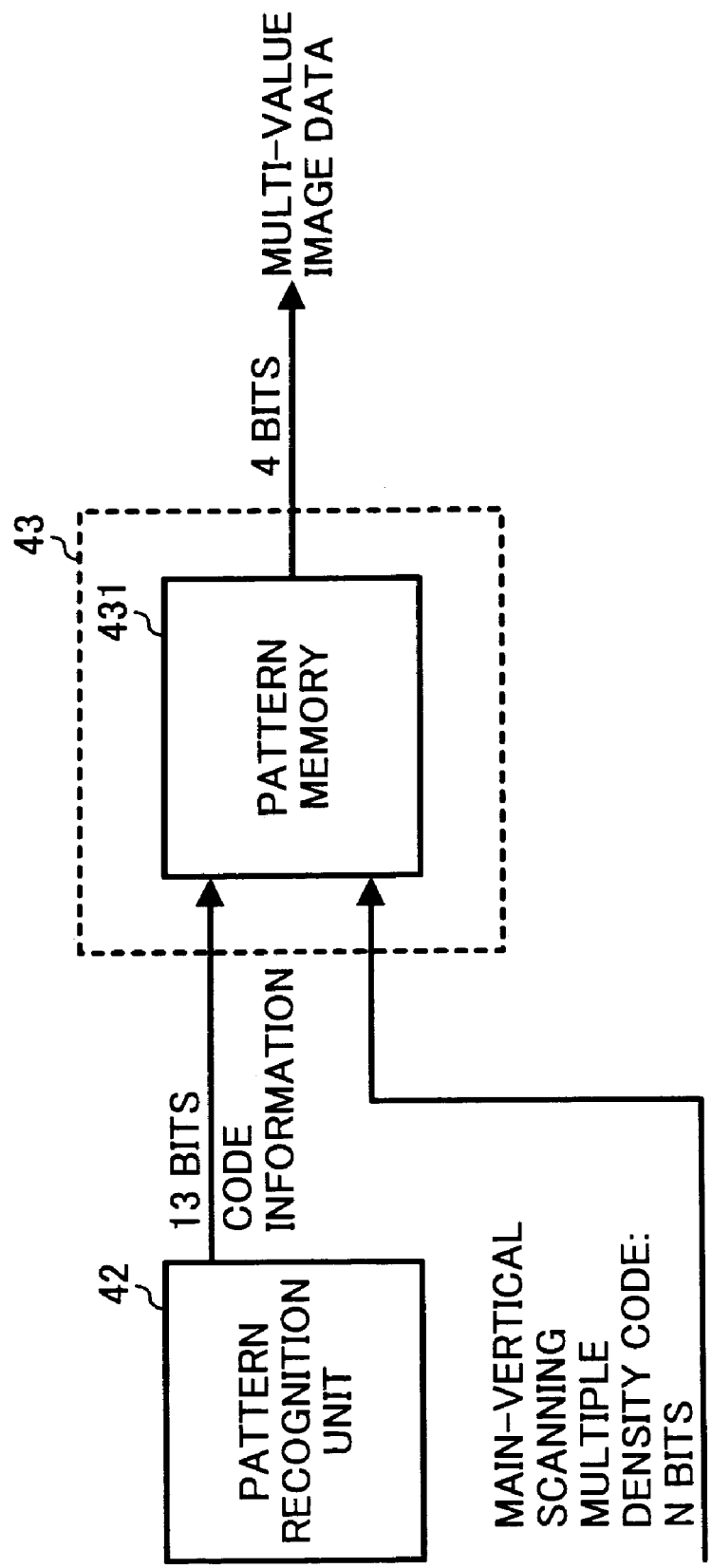
FIG. 15 is a block diagram illustrating a double density mode processing implemented by using only a pattern memory for the memory block of FIG. 8.

Assuming that this smoothing process is carried out in a manner similar to the single density mode processing illustrated in FIG. 15 using only the pattern memory 431, this incurs a considerable increase in memory volume.

Namely, since the specification of the memory has to include 4 bits of information for each address, which is specified by the binary 13 bits pattern code information illustrated in FIG. 15 and Y bits main-vertical multiple density code.

Then assuming Y=4 in the case of triple density for the main-vertical multiple density code, a memory volume of 512 kbits (128 kbits for address since Y=4 in binary and 4 bits for data) is needed, which amounts to 16 times the memory volume required for single density mode processing described earlier, whereby the memory costs increases considerably.

In addition, it is generally known that jaggies tend to be more visible at low resolution than high resolution image data and the smoothing operation is expected to be more effective with the former data. And, the effect of the smoothing operation is considered evident even with low bit number in multi-value image data conversion.

Therefore, in consideration of these results, the disadvantageous costs increase by memory volume of the multiple density mode image pattern generator 432 and selector 433 in addition to the pattern memory 431 as illustrated in FIG. 12, in which the pattern memory 431 can be constructed with a lower volume of memory as noted earlier.

Namely, in the case of the smoothing process (binary ⇒multi-value conversion process), the image data conversion is carried out according to the main-vertical scanning multiple density code (Y bits), which is generated during the process of converting resolution from 400 dpi to 1200 dpi, in addition to the pattern code information (13 bits) obtained from the results on the objective and surrounding pixels.

Although the operations of image data conversion are similar to those described earlier, alternate operations are carried out such as generating multi-value image data by the multiple density mode image pattern generator 432 without implementing the aforementioned operations of FIG. 15 by the pattern memory 431.

The multiple density mode image pattern generator 432 can have no memory device but a combination circuit capable of outputting an arrangement of a pixel output, which corresponds to each pixel of input image data so as to form an aligned pixel series.

Namely, the multiple density mode image pattern generator 432 can be configured as follows.

Figure 16:
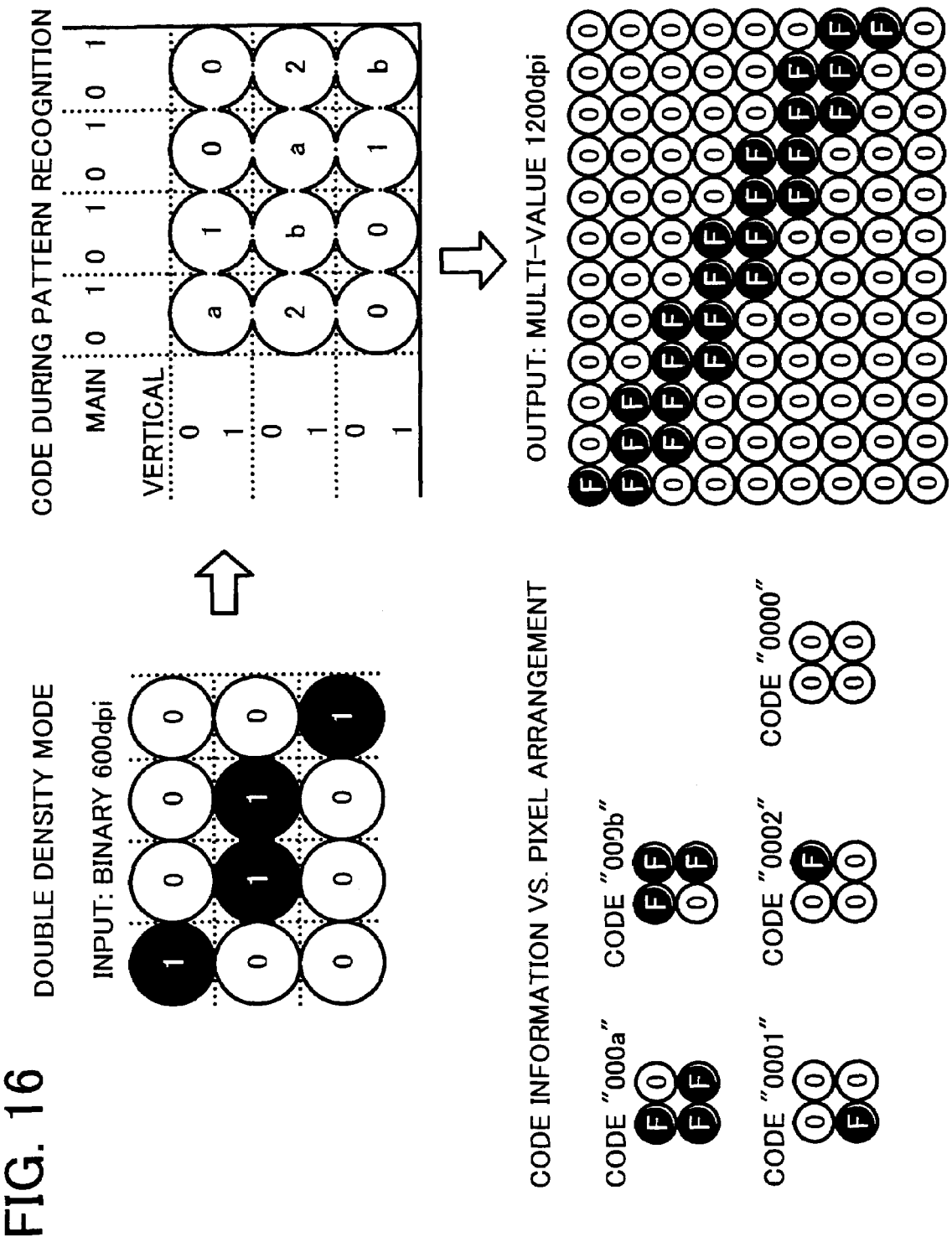
FIG. 16 illustrates details of the double density mode processing implemented by the multiple density mode image pattern generator of FIG. 12.
Figure 17:
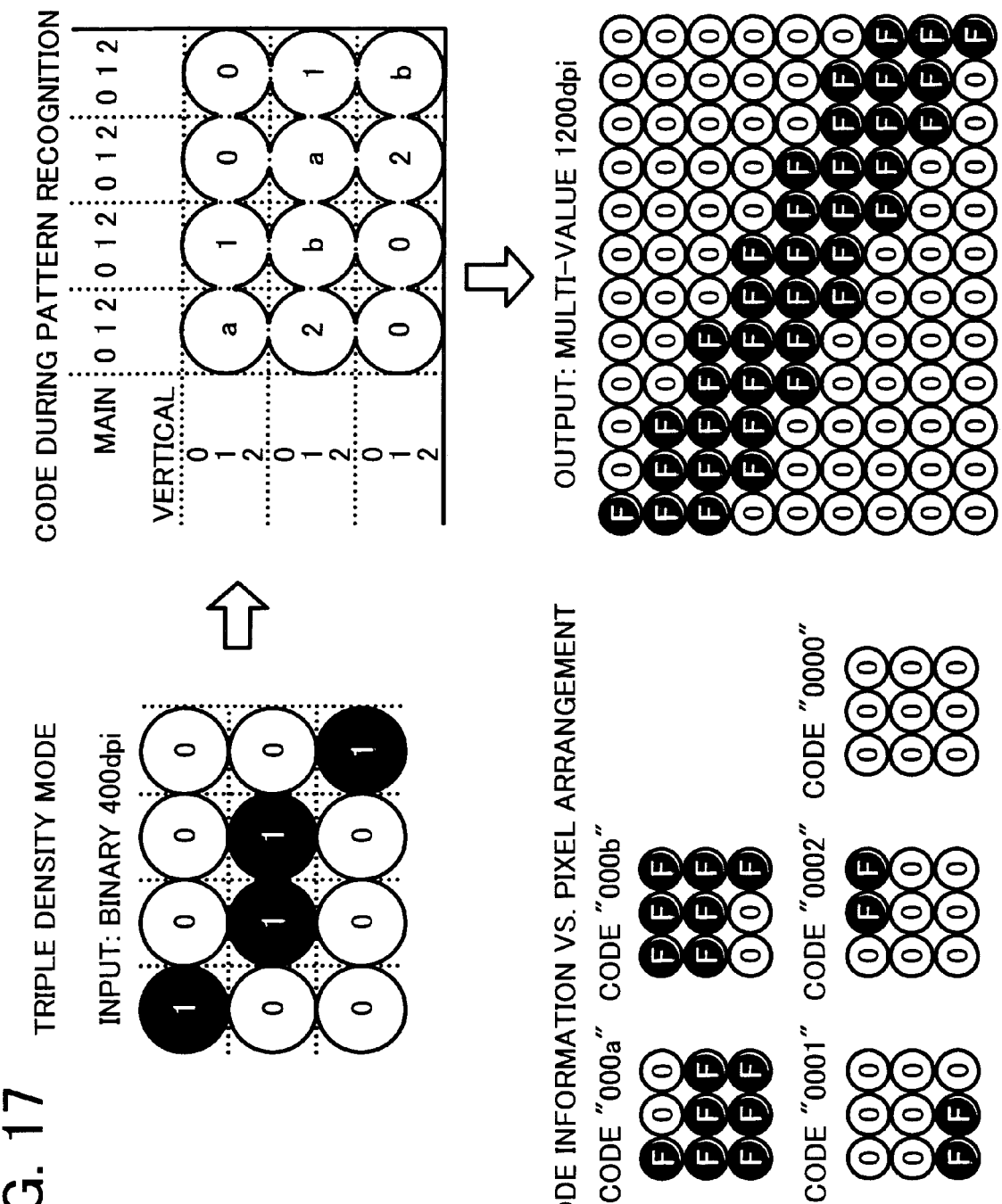
FIG. 17 illustrates details of a triple density mode processing implemented by the multiple density mode image pattern generator of FIG. 12.
Figure 18B:
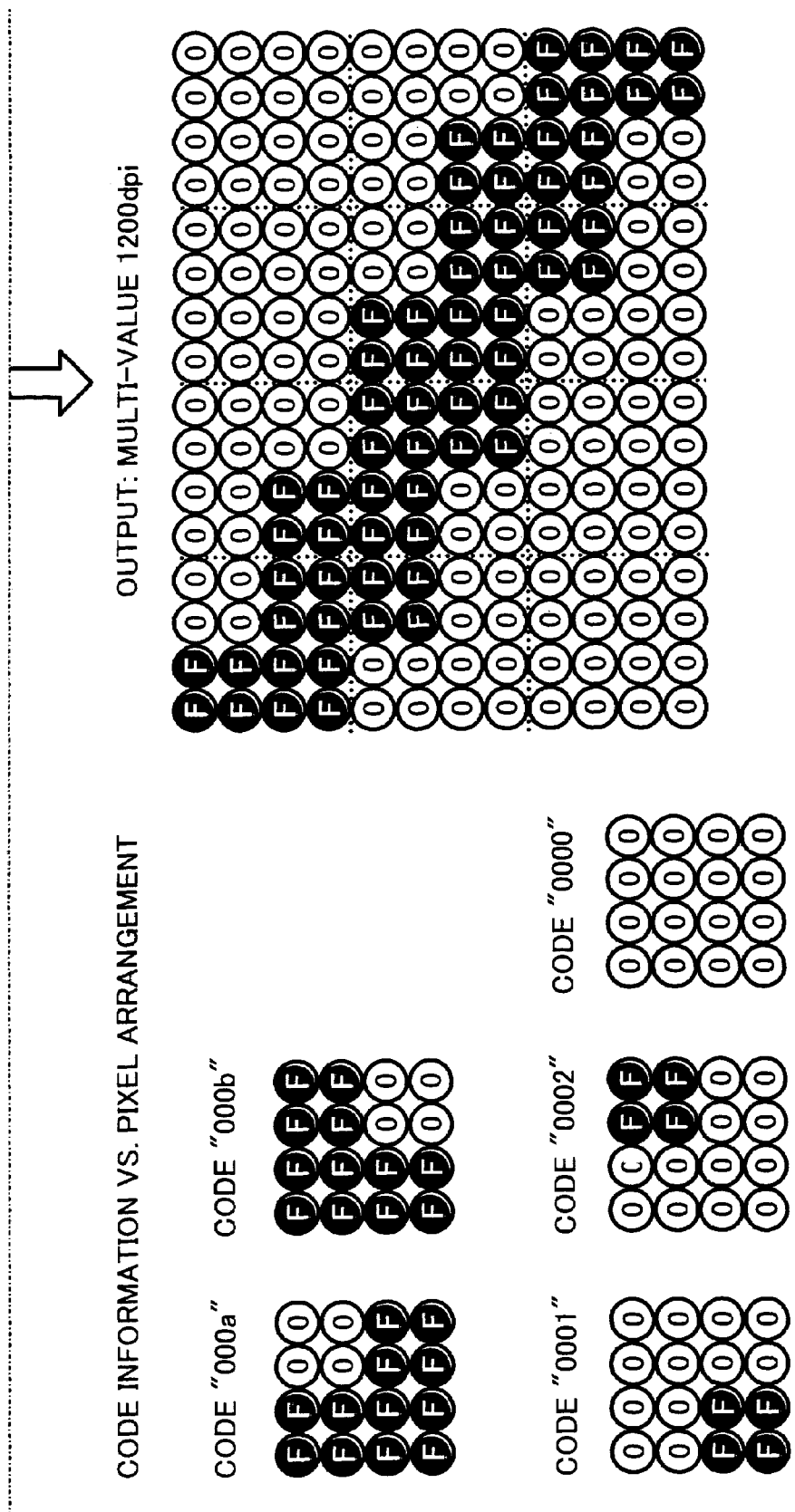
FIG. 18 illustrates details of a quadruple density mode processing implemented by the multiple density mode image pattern generator of FIG. 12.
Figure 19B:
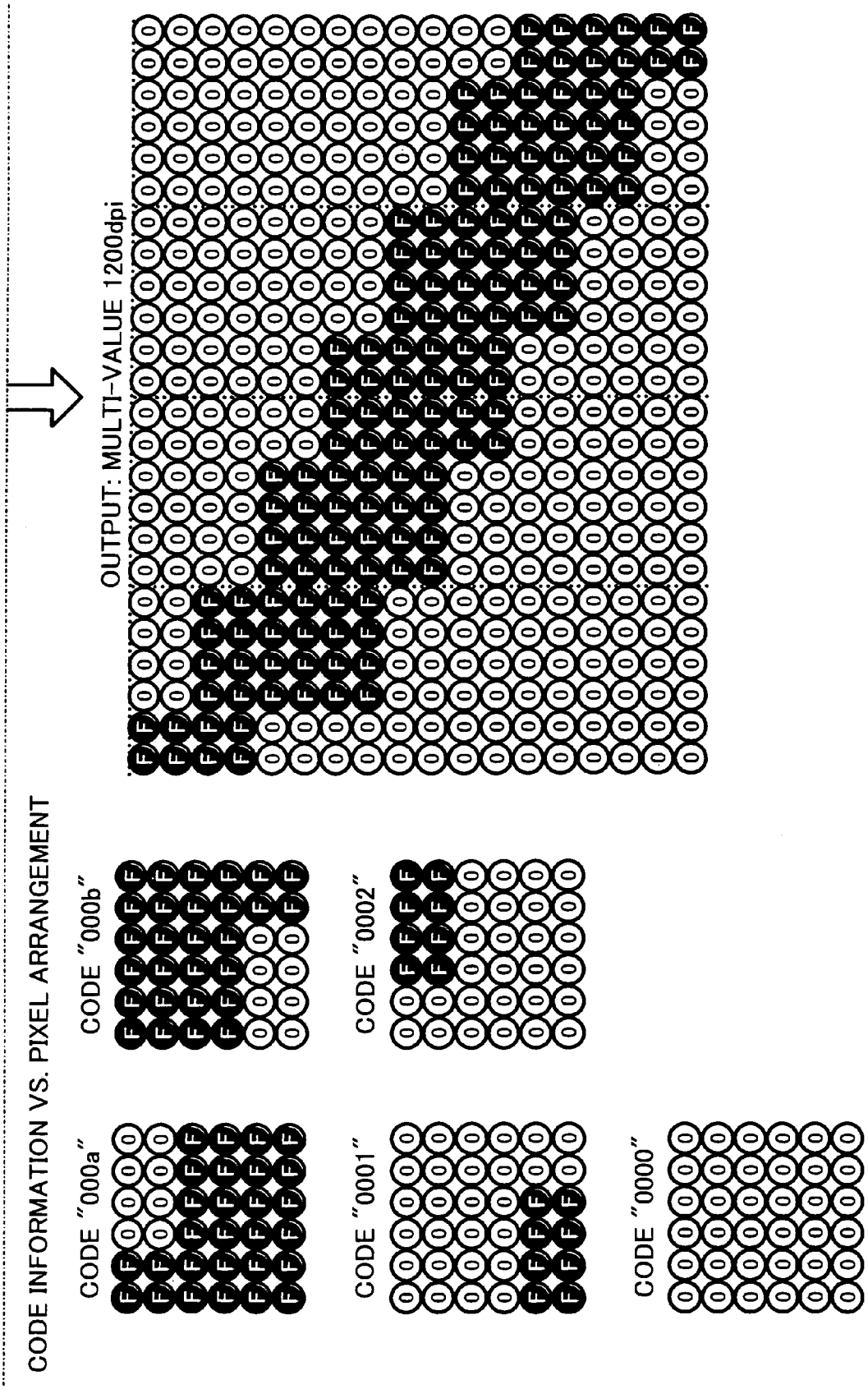
FIG. 19 illustrates details of a sextuple density mode processing implemented by the multiple density mode image pattern generator of FIG. 12.

In a case of input image data with 600 dpi resolution the configuration is as illustrated in FIG. 16, to implement the multiplication of the number of pixels of two times in both the main and vertical scanning directions so as each pixel to be composed of four pixels with 1200 dpi. In a case of input image data with 400 dpi resolution the configuration is as illustrated in FIG. 17, to implement the multiplication of the number of pixels of three times in both the main and vertical scanning directions so as each pixel to be composed of nine pixels with 1200 dpi. In a case of input image data with 300 dpi resolution the configuration is as illustrated in FIG. 18, to implement the multiplication of the number of pixels of four times in both the main and vertical scanning directions so as each pixel to be composed of sixteen pixels with 1200 dpi. In case of input image data with 200 dpi resolution the configuration is as illustrated in FIG. 19, to implement the multiplication of the number of pixels of six times in both the main and vertical scanning directions so as each pixel to be composed of 36 pixels with 1200 dpi.

Although the image data for each pixel with the outputting resolution are ones of multi-value, it is assumed in the above cases that half-tone image data, which are included in FIG. 14 as the constituents filling the gap between the fully white and fully black pixels, are not included, but that here included are the multi-valued fully black pixels ("F" in FIGS. 16 through 19) and fully white pixels ("0" in FIGS. 14, and 16 through 19).

In addition, for the binary image data containing the data of "0" and "1" during data input with 600, 400, 300 or 200 dpi resolution, it can be seen from FIGS. 16 through 19, in the case when certain pixels have the same pattern regardless of the operation mode, they are converted to the same code information through pattern recognition by the window 41.

Furthermore, by outputting an arrangement of pixel output as an aligned pixel series each corresponding to a pixel of input image data by the multiple density mode image pattern generator 432 utilizing the main-vertical scanning multiple density code shown in FIGS. 16 through 19, image qualities can improve.

Also, in the case of double density of FIG. 16 and quadruple density of FIG. 18, and triple density of FIG. 17 and sextuple density of FIG. 19, respectively, 1220 dpi pixel structures are different as shown in these drawings. It should be noted, however, resultant images are printed to be the same and equivalent image qualities can be obtained in respective cases.

It is also shown that the examples illustrated in FIG. 16 for the double density, and FIG. 18 for the quadruple density, and FIG. 17 for the triple density and FIG. 19 for the sextuple density, respectively, indicate clearly the correspondence of image data multiplications with respect to the prime numbers such as, for example, two and three (that is, double and triple density). Therefore, the improvements in image output can be achieved by optimizing the pixel structure output for each multiplication of prime number of times.

It is apparent from the above description including example, the data conversion system disclosed herein has several advantages over similar systems previously known.

For example, as described hereinabove, the image data processing machine 1 in accordance with the exemplary embodiment of the invention is adapted, during implementing image data processings of:

extracting respective pixel data in a predetermined region centering around an objective pixel;

among image data expanded into a bitmap with an arbitrary resolution as a bitmap in the window 41 of M pixels in the main scanning direction and N lines of the M pixels in the vertical scanning direction;

generating by the pattern recognition unit the pattern code information with plural bits for characterizing the line segment feature concerning to the objective pixel after recognizing a line segment feature of the boundary between a black pixel region and a white pixel in the respective pixel data extracted by the window unit;

utilizing at least a portion of the pattern code information, discriminating by the discriminant unit whether the objective pixel is required to be corrected as a pixel for forming an oblique line or a circular arc; and retrieving correction data stored in advance for pixels discriminated as to be corrected among the objective pixels according to the pattern code information generated by the pattern recognition unit as an address, and to render the correction data to be multi-valued and subsequently be output;

to instruct the memory block unit to implement different data conversion during an image data conversion from binary to multi-value, in which data conversion is different between the first case where multi-valued image data are output with the same resolution as input image data and the second case where further multi-valued image data are output with an arbitrary resolution at least twice higher, and with an increased number of pixels at least twice larger, than the input image data; and in the second case in which the input binary image data with an arbitrary solution are output as Y-bit multi-valued image data with a resolution of at least twice larger and with an increased number of pixels of H ($\geq 2$) times that of the input image data, the memory block unit is further provided with the multiple density mode image pattern generator configured to implement the conversion of the Y-bit multi-valued image data with an arbitrary resolution into two kinds of data indicative of fully white and fully black pixels among the Y-bit multi-valued input binary image data so that, in the case in which the input binary image data with an arbitrary solution are output as Y-bit multi-valued image data with an increased number of pixels of 2×H times, image data are output by the multiple density mode image pattern generator with a variable power of two in the direction of 2×H times pixel increase with respect to a pixel composition consisting the fully white and fully black pixels of Y-bit multi-valued input binary image data with an arbitrary resolution with an increased number of pixels of H-times.

As a result, a conversion processing becomes feasible as follows. In the case of converting the output image data to have at least a twice resolution, a four times increase in the number of pixel has been previously required twice in both the main and vertical scanning directions.

In accordance with the present invention, however, a simpler binary ⇒multi-value conversion processing can be carried out by rendering the pixel data multi-valued in the main and vertical scanning directions.

Furthermore, in spite of lower resolution such as in the case of quadruple density (that is, twice two times), the noted processings similar to those for the double density mode can substantially be used, whereby low costs can be achieved for the data processing.

Also with the image data processing machine 1 of the present invention, the multiple density mode image pattern generator 432 is also adapted to generate, as the noted two kinds of Y-bit multi-valued data indicative of fully white and fully black pixels with an arbitrary resolution, a plurality of sets of data different for respective pixel compositions each designated by a prime number specified by the number of multiplication H of pixels in the image output with respect to image input.

As a result, corrections of jaggies can be made on the pixels for forming an oblique line or a circular arc in even high resolution image data and the pixel density multiplication can also feasible for a prime number that cannot be carried out a simple multiplication based on the integral number.

Therefore, the image data processing steps described herein above are suitably adoptable to digital imaging apparatuses such as, for example, a printing machine, duplication machine and facsimile apparatus.

Obviously, additional modifications and variations of the present invention are possible in light of the above teachings. It is therefore to be understood that within the scope of the appended claims, the invention may be practiced otherwise than as specifically described herein.

This document claims priority and contains subject matter related to Japanese Patent Application No. 2003-373376, filed with the Japanese Patent Office on Oct. 31, 2003, the entire contents of which are hereby incorporated herein by reference.

The invention claimed is:

1. An image data processing machine, comprising:

a memory unit configured to store image data of at least N lines among input binary image data expanded into a bitmap with an arbitrary resolution;

a window unit configured to extract respective pixel data in a predetermined region centering around an objective pixel among stored image data, said stored image data being stored in said memory unit and being expanded into the bitmap of M pixels in a main scanning direction and N lines of said M pixels in a vertical scanning direction;

a pattern recognition unit configured, after recognizing a line segment feature of a boundary between a black pixel region and a white pixel in said respective pixel data extracted by said window unit, to generate pattern code information with plural bits for characterizing said line segment feature concerning to said objective pixel;

a discriminant unit configured, utilizing at least a portion of said pattern code information, to discriminate whether said objective pixel is required to be corrected as a pixel for forming an oblique line or a circular arc; and a memory block unit configured to retrieve correction data stored in advance for pixels discriminated as to be corrected by said discriminant unit among said objective pixels according to said pattern code information generated by said pattern recognition unit as an address, and to render said correction data to be multi-valued and subsequently be output; wherein said memory block unit is configured, in a process of rendering said input binary image data expanded into a bitmap with an arbitrary solution to be multi-valued based on characteristics of said line segment feature recognized by said pattern recognition unit, to implement data conversion during an image data conversion from binary to multi-value that differs between a first case in which multi-valued image data are output with a same resolution as input image data and a second case in which further multi-valued image data are output with an arbitrary resolution at least twice higher, and with an increased number of pixels at least twice larger, than said input image data; and wherein, in said second case in which said input binary image data with an arbitrary solution are output as Y-bit multi-valued image data with a resolution of at least twice larger and with an increased number of pixels of H ($\geqq 2$) times than that of said input image data, said memory block unit is further provided with a multiple density mode image pattern generator configured to implement a conversion of said Y-bit multi-valued image data with an arbitrary resolution into two kinds of data indicative of fully white and fully black pixels among said Y-bit multi-valued input binary image data so that, in a case in which said input binary image data with an arbitrary solution are output as Y-bit multi-valued image data with an increased number of pixels of 2×H times, image data are output by said multiple density mode image pattern generator with a variable power of two in a direction of 2×H times pixel increase with respect to a pixel composition of said fully white and fully black pixels of Y-bit multi-valued input binary image data with an arbitrary resolution with an increased number of pixels of H-times.

2. The image data processing machine according to claim 1, wherein the input image binary data are output as Y-bit multi-valued image data with a resolution two times larger than that of said input image binary data.

3. The image data processing machine according to claim 1, wherein the input image binary data are output as Y-bit multi-valued image data with a resolution three times larger than that of said input image binary data.

4. The image data processing machine according to claim 1, wherein the input image binary data are output as Y-bit multi-valued image data with a resolution four times larger than that of said input image binary data.

5. The image data processing machine according to claim 1, wherein the input image binary data are output as Y-bit multi-valued image data with a resolution six times larger than that of said input image binary data.

6. The image data processing machine according to claim 1, wherein said multiple density mode image pattern generator generates, as said two kinds of Y-bit multi-valued data indicative of fully white and fully black pixels with an arbitrary resolution, a plurality of sets of data different for respective pixel compositions each designated by a prime number specified by a number of multiplication H of pixels in said image output with respect to image input.

7. An image data processing machine, comprising:

means for storing image data of at least N lines among input binary image data expanded into a bitmap with an arbitrary resolution;

means for extracting respective pixel data in a predetermined region centering around an objective pixel among stored image data, said stored image data being stored in said means for storing and being expanded into the bitmap of M pixels in a main scanning direction and N lines of said M pixels in a vertical scanning direction;

means, after recognizing a line segment feature of a boundary between a black pixel region and a white pixel in said respective pixel data extracted by said window means, for generating pattern code information with plural bits for characterizing said line segment feature concerning to said objective pixel;

means, utilizing at least a portion of said pattern code information, for discriminating whether said objective pixel is required to be corrected as a pixel for forming an oblique line or a circular arc; and means for retrieving correction data stored in advance for pixels discriminated as to be corrected by said means for discriminating among said objective pixels according to said pattern code information generated by said pattern recognition unit as an address, and rendering said correction data to be multi-valued and subsequently be output; wherein said means for retrieving, in a process of rendering said input binary image data expanded into a bitmap with an arbitrary solution to be multi-valued based on characteristics of said line segment feature recognized by said pattern recognition means, implements data conversion during an image data conversion from binary to multi-value different between a first case in which multi-valued image data are output with a same resolution as input image data and a second case in which further multi-valued image data are output with an arbitrary resolution at least twice higher, and with an increased number of pixels at least twice larger, than said input image data; and wherein, in said second case in which said input binary image data with an arbitrary solution are output as Y-bit multi-valued image data with a resolution of at least twice larger and with an increased number of pixels of H ($\geqq 2$) times than that of said input image data, said means for retrieving is further provided with a means for implementing a conversion of said Y-bit multi-valued image data with an arbitrary resolution into two kinds of data indicative of fully white and fully black pixels among said Y-bit multi-valued input binary image data so that, in a case in which said input binary image data with an arbitrary solution are output as Y-bit multi-valued image data with an increased number of pixels of 2×H times, image data are output by said means for implementing a conversion with a variable power of two in a direction of 2×H times pixel increase with respect to a pixel composition of said fully white and fully black pixels of Y-bit multi-valued input binary image data with an arbitrary resolution with an increased number of pixels of H-times.

8. The image data processing machine according to claim 7, wherein the input image binary data are output as Y-bit multi-valued image data with a resolution two times larger than that of said input image binary data.

9. The image data processing machine according to claim 7, wherein the input image binary data are output as Y-bit multi-valued image data with a resolution three times larger than that of said input image binary data.

10. The image data processing machine according to claim 7, wherein the input image binary data are output as Y-bit multi-valued image data with a resolution four times larger than that of said input image binary data.

11. The image data processing machine according to claim 7, wherein the input image binary data are output as Y-bit multi-valued image data with a resolution six times larger than that of said input image binary data.

12. The image data processing machine according to claim 7, wherein
said multiple means for implementing a conversion generates, as said two kinds of Y-bit multi-valued data indicative of fully white and fully black pixels with an arbitrary resolution, a plurality of sets of data different for respective pixel compositions each designated by a prime number specified by a number of multiplication H of pixels in said image output with respect to image input.

13. An image data processing method, comprising:
storing image data of at least N lines among input binary image data expanded into a bitmap with an arbitrary resolution;
extracting respective pixel data in a predetermined region centering around an objective pixel among stored image data, said stored image data being expanded into the bitmap of M pixels in a main scanning direction and N lines of said M pixels in a vertical scanning direction;
generating, after recognizing a line segment feature of a boundary between a black pixel region and a white pixel in said extracted respective pixel data, pattern code information with plural bits for characterizing said line segment feature concerning to said objective pixel;
discriminating, utilizing at least a portion of said pattern code information, whether said objective pixel is required to be corrected as a pixel for forming an oblique line or a circular arc; and
retrieving correction data stored in advance for pixels discriminated as to be corrected among said objective pixels according to said pattern code information generated as an address, and rendering said correction data to be multi-valued and subsequently be output; wherein
said retrieving, in a process of rendering said input binary image data expanded into a bitmap with an arbitrary solution to be multi-valued based on characteristics of said line segment feature recognized, implements data conversion during an image data conversion from binary to multi-value different between a first case in which multi-valued image data are output with a same resolution as input image data and a second case in which further multi-valued image data are output with an arbitrary resolution at least twice higher, and with an increased number of pixels at least twice larger, than said input image data; and wherein,
in said second case in which said input binary image data with an arbitrary solution are output as Y-bit multi-valued image data with a resolution of at least twice larger and with an increased number of pixels of H ($\geq$2) times than that of said input image data, said retrieving further implements a conversion of said Y-bit multi-valued image data with an arbitrary resolution into two kinds of data indicative of fully white and fully black pixels among said Y-bit multi-valued input binary image data so that, in a case in which said input binary image data with an arbitrary solution are output as Y-bit multi-valued image data with an increased number of pixels of 2×H times, image data are output for implementing a conversion with a variable power of two in a direction of 2×H times pixel increase with respect to a pixel composition of said fully white and fully black pixels of Y-bit multi-valued input binary image data with an arbitrary resolution with an increased number of pixels of H-times.

14. The image data processing machine according to claim 13, wherein the input image binary data are output as Y-bit multi-valued image data with a resolution two times larger than that of said input image binary data.

15. The image data processing machine according to claim 13, wherein the input image binary data are output as Y-bit multi-valued image data with a resolution three times larger than that of said input image binary data.

16. The image data processing machine according to claim 13, wherein the input image binary data are output as Y-bit multi-valued image data with a resolution four times larger than that of said input image binary data.

17. The image data processing machine according to claim 13, wherein the input image binary data are output as Y-bit multi-valued image data with a resolution six times larger than that of said input image binary data.

18. The image data processing machine according to claim 13, wherein
said implementing a conversion generates, as said two kinds of Y-bit multi-valued data indicative of fully white and fully black pixels with an arbitrary resolution, a plurality of sets of data different for respective pixel compositions each designated by a prime number specified by a number of multiplication H of pixels in said image output with respect to image input.

* * * * *